United States Patent
Murakami et al.

(10) Patent No.: US 9,550,545 B2
(45) Date of Patent: Jan. 24, 2017

(54) SHOCK ABSORBER

(71) Applicant: Showa Corporation, Gyoda-shi (JP)

(72) Inventors: Yosuke Murakami, Fukuroi (JP); Kazuhiro Miwa, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/865,991

(22) Filed: Sep. 25, 2015

(65) Prior Publication Data

US 2016/0090146 A1    Mar. 31, 2016

(30) Foreign Application Priority Data

Sep. 30, 2014    (JP) ................. 2014-202118

(51) Int. Cl.
| | | |
|---|---|---|
| *F16F 9/34* | (2006.01) | |
| *B62K 25/28* | (2006.01) | |
| *F16F 9/19* | (2006.01) | |
| *F16F 9/50* | (2006.01) | |
| *F16F 9/46* | (2006.01) | |

(52) U.S. Cl.
CPC ................. *B62K 25/28* (2013.01); *F16F 9/19* (2013.01); *F16F 9/34* (2013.01); *F16F 9/46* (2013.01); *F16F 9/464* (2013.01); *F16F 9/50* (2013.01); *F16F 2230/24* (2013.01)

(58) Field of Classification Search
CPC .............. F16F 9/464; F16F 9/465; F16F 9/46; F16F 9/461; F16F 9/50; F16F 9/512
USPC ...................... 188/266.1, 266.2, 266.5, 266.6
See application file for complete search history.

(56) References Cited

U.S. PATENT DOCUMENTS

| | | | | |
|---|---|---|---|---|
| 5,413,196 A | * | 5/1995 | Forster ................. | F16F 9/446 188/266.6 |
| 6,182,805 B1 | * | 2/2001 | Kashiwagi ............. | F16F 9/325 188/266.6 |
| 8,413,774 B2 | * | 4/2013 | Murakami ............. | F16F 9/465 188/282.2 |
| 9,046,145 B2 | * | 6/2015 | Murakami ............. | F16F 9/325 |
| 2011/0073424 A1 | * | 3/2011 | Murakami ............. | F16F 9/465 188/322.13 |

(Continued)

FOREIGN PATENT DOCUMENTS

| | | |
|---|---|---|
| EP | 2492534 A | 8/2012 |
| JP | 2011-075060 A | 4/2011 |

OTHER PUBLICATIONS

Extended European Search Report mailed Jun. 16, 2016 for the corresponding European Patent Application No. 15187037.5.

*Primary Examiner* — Thomas J Williams
(74) *Attorney, Agent, or Firm* — Leason Ellis LLP

(57) ABSTRACT

A shock absorber includes: a valve body; a valve seat; an actuator; and a fail-safe valve that is urged by a first elastic body. When fluid does not flow, the fail-safe valve is urged by the first elastic body to come into contact with the valve body and close a channel. When the fluid flows, the fail-safe valve is spaced from the valve body by a fluid pressure to open the channel. When the valve body moves most in a valve opening direction, the fail-safe valve is brought into contact with the valve body and the channel is closed, and a supporting portion supports a part of the fail-safe valve. When the fluid flows in this state, at least a part of the fail-safe valve, which is in contact with a non-supporting portion, is spaced from the valve body by the fluid pressure to open the channel.

11 Claims, 17 Drawing Sheets

(56) References Cited

U.S. PATENT DOCUMENTS

| | | | |
|---|---|---|---|
| 2012/0305348 A1* | 12/2012 | Katayama | B60G 17/08 188/266.2 |
| 2013/0275003 A1* | 10/2013 | Uchino | B60G 17/06 701/40 |
| 2015/0276004 A1* | 10/2015 | Murakami | F16F 9/512 188/313 |
| 2016/0091044 A1* | 3/2016 | Murakami | F16F 9/34 188/313 |
| 2016/0195152 A1* | 7/2016 | Mori | F16F 9/465 188/313 |

* cited by examiner

ONE END SIDE ←——→ OTHER END SIDE
AXIAL DIRECTION

Related Art　　　Related Art

SHOCK ABSORBER

CROSS-REFERENCE TO RELATED APPLICATIONS

This application is based on and claims priority under 35 USC 119 from Japanese Patent Application No. 2014-202118 filed on Sep. 30, 2014, the entire content of which is incorporated herein by reference.

BACKGROUND

1. Technical Field

The present invention relates to a shock absorber including a damping-force generating device that controls a flow of working fluid caused by sliding of a piston in a cylinder and thereby generates a damping force.

2. Related Art

As a shock absorber used as a rear cushion that suspends a rear wheel of a motorcycle on a vehicle body, for example, there is a shock absorber including a cylinder in which working fluid is sealed, a piston fitted in the cylinder to be capable of sliding, and a piston rod coupled to the piston and extended to an outside of the cylinder. The shock absorber includes a damping-force generating device that controls a flow of oil caused by the sliding of the piston in the cylinder and thereby generates a damping force.

In such a shock absorber, as a control valve for adjusting the damping force, for example, there is known a control valve including a valve body urged in a valve opening direction by urging means such as a spring, a valve seat on which the valve body is seated, and an actuator that moves the valve body in a valve closing direction by the thrust of a solenoid and seats the valve body on the valve seat.

The shock absorber including the control valve controls an electric current supplied to the solenoid, which is the actuator, to adjust, with the thrust of the solenoid, a load in the valve closing direction in which the valve body is seated on the valve seat, and thus controls an opening degree of the valve body to adjust a hydraulic pressure to thereby adjust the damping force.

In the shock absorber, at a failure time when the solenoid is broken down by some cause, energization to the solenoid is interrupted, and the solenoid does not generate the thrust, the valve body of the control valve moves with an urging force of the urging means and changes to a full-open state. Therefore, for example, the adjusted hydraulic pressure drops, the damping force suddenly decreases, and operation stability of a vehicle is hindered.

Therefore, Patent literature 1 (JP-A-2011-075060) proposes a shock absorber shown in FIGS. 23A and 23B. Note that FIGS. 23A and 23B are main part sectional views of the shock absorber proposed in Patent Literature 1. FIG. 23A shows a state at a normal time. FIG. 23B shows a state at the failure time.

In the shock absorber proposed in Patent Literature 1, a valve body 170 configuring a control valve for controlling a back pressure of a main valve, which controls a flow of oil caused by sliding of a piston in a cylinder to generate a damping force, is urged to a valve opening side (the right in FIGS. 23A and 23B) by a valve spring 173, which is urging means. An annular sheet disk 190 is fixed in contact with a rear end face (a right end face in FIGS. 23A and 23B) of the valve body 170. An annular sheet-like fail-safe valve 175 is disposed on a downstream side of the valve body 170. An outer circumferential portion of the fail-safe valve 175 is clamped and fixed by a pilot valve member 148 and a holding member 149.

The valve body 170 is attached to a distal end of an actuation rod 167 that moves in an axial direction (the left-right direction in FIGS. 23A and 23B) with thrust generated by a not-shown solenoid, which is an actuator. At the normal time when the solenoid normally operates, the valve body 170 moves with the thrust of the solenoid and is spaced from or seated on a circumferential edge of a port 171 of a pilot valve member 148 as shown in FIG. 23A to thereby open and close the port 171. Note that, at the normal time, the valve body 170 and the sheet disk 190 in contact with the valve body 170 are spaced from the fail-safe valve 175. Therefore, a pilot channel 150 is always in an open state.

At the normal time when the solenoid normally operates, it is possible to control a supply current to the solenoid and adjust a valve opening pressure of the valve body 170 to thereby adjust an internal pressure of a not-shown pilot chamber (the back pressure of the not-shown main valve) and thereby control the opening degree of the main valve to adjust the damping force.

At the failure time when the solenoid does not normally operate because of, for example, disconnection of a coil, the solenoid does not generate the thrust. Therefore, the valve body 170 and the sheet disk 190 in contact with the valve body 170 move in a valve opening direction (the right in FIGS. 23A and 23B) with the urging force of the valve spring 173 as shown in FIG. 23B. An outer circumferential portion of the sheet disk 190 comes into contact with an inner circumferential portion of the fail-safe valve 175 and closes the pilot channel. When the internal pressure of the pilot chamber reaches a predetermined value in this state, the fail-safe valve 175 bends centering on the outer circumferential portion as indicated by a dotted line in FIG. 23B and flows fluid. Therefore, a sudden decrease in the internal pressure of the pilot chamber is prevented by the flow resistance of the fluid. Consequently, a sudden decrease in the damping force due to a sudden increase in the opening degree of the main valve is prevented.

SUMMARY OF INVENTION

The damping force adjustment-type shock absorber proposed in Patent Literature 1 can perform a fail-safe function for preventing a sudden change in the damping force at a failure time when the solenoid does not normally operate. However, at a normal time when the solenoid normally operates, as shown in FIG. 23A, the pilot channel 150 is always in the open state. The fail-safe valve 175 does not perform a check valve function. Therefore, it is likely that fluid flows back in the pilot channel 150. It is also likely that variation occurs in the damping force of the fail-safe valve 175 because of, for example, a difference in a stop position of the valve body 170 at the failure time and a setting position of the fail-safe valve 175.

In view of above, a new configuration for realizing a fail-safe function is proposed. An illustrative aspect of the present invention is to provide a shock absorber that has a fail-safe valve exhibiting both a fail-safe function and a check valve function and attains stability of a damping force at the failure time.

A shock absorber of an embodiment includes: a cylinder in which fluid is sealed; a piston that is slidably fitted into the cylinder; a piston rod that is coupled to the piston and extends to an outside of the cylinder; and a valve mechanism that controls a flow of the fluid caused by sliding of the piston in the cylinder, in which the valve mechanism includes: a valve body that is urged by urging means in a valve opening direction of a channel in which the fluid flows; a valve seat on which the valve body is seated to close the channel; an actuator that moves the valve body in a valve closing direction with thrust of a solenoid; and a fail-safe valve that is urged by a first elastic body in the valve closing direction of the valve body, at least a part of the fail-safe valve being seated on the valve body to close the channel and being spaced from the valve body to open the channel, when the fluid does not flow in the valve opening direction of the valve body, the fail-safe valve is urged by the first elastic body to thereby come into contact with the valve body and close the channel, when the fluid flows in the valve opening direction of the valve body, the fail-safe valve is spaced from the valve body by a fluid pressure to open the channel, and when the valve body moves most in the valve opening direction from the valve seat, the fail-safe valve is brought into contact with the valve body, the channel is closed, and a supporting portion of the valve body supports a part of the fail-safe valve, and, when the fluid flows in the valve opening direction of the valve body, at least a part of the fail-safe valve, which is in contact with a non-supporting portion other than the supporting portion of the valve body, is spaced from the valve body by the fluid pressure to open the channel.

With the configuration discussed above, it is possible to provide a shock absorber that includes both of a fail-safe function and a check valve function and attain stability of a damping force at the failure time.

DESCRIPTION OF EMBODIMENTS

Embodiments of the present invention are explained below with reference to the drawings.

Structure of a Shock Absorber

Figure 1:
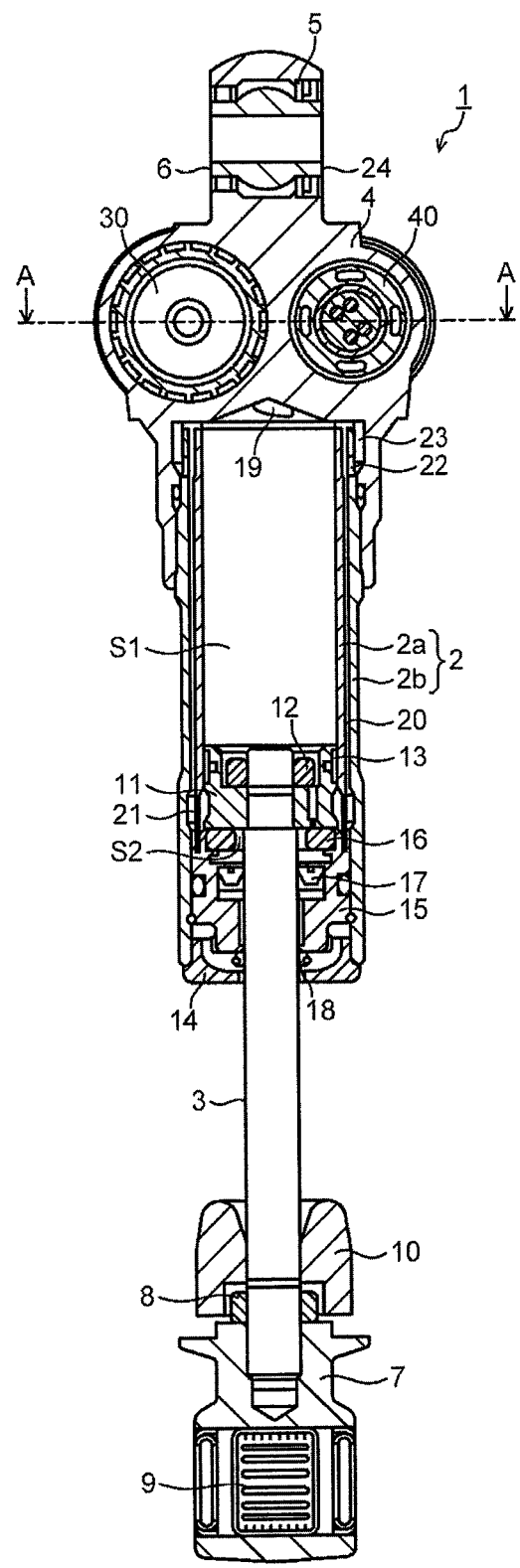
FIG. 1 is a longitudinal sectional view of a shock absorber in a first embodiment.
Figure 2:
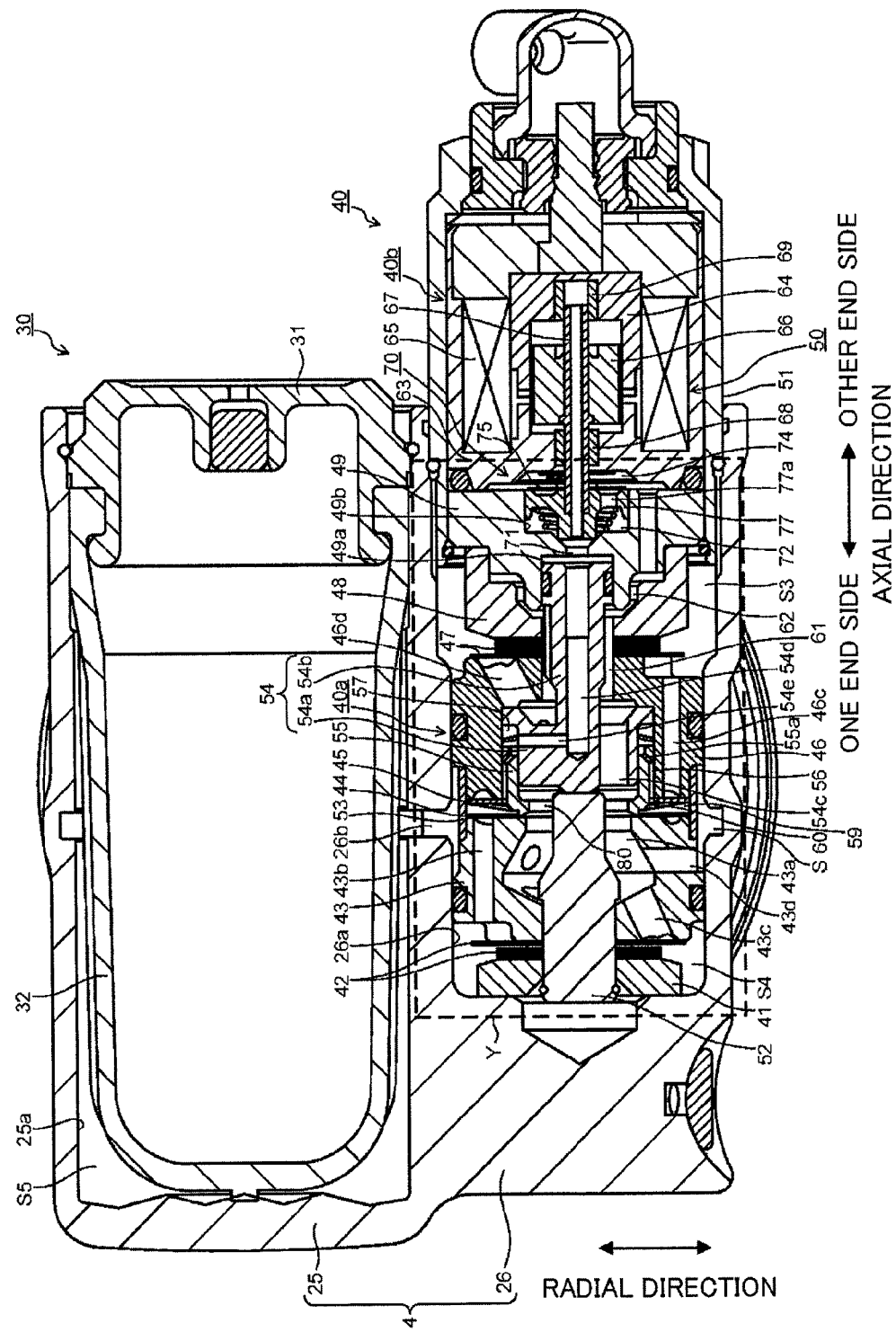
FIG. 2 is a sectional view along a line A-A of FIG. 1.
Figure 3:
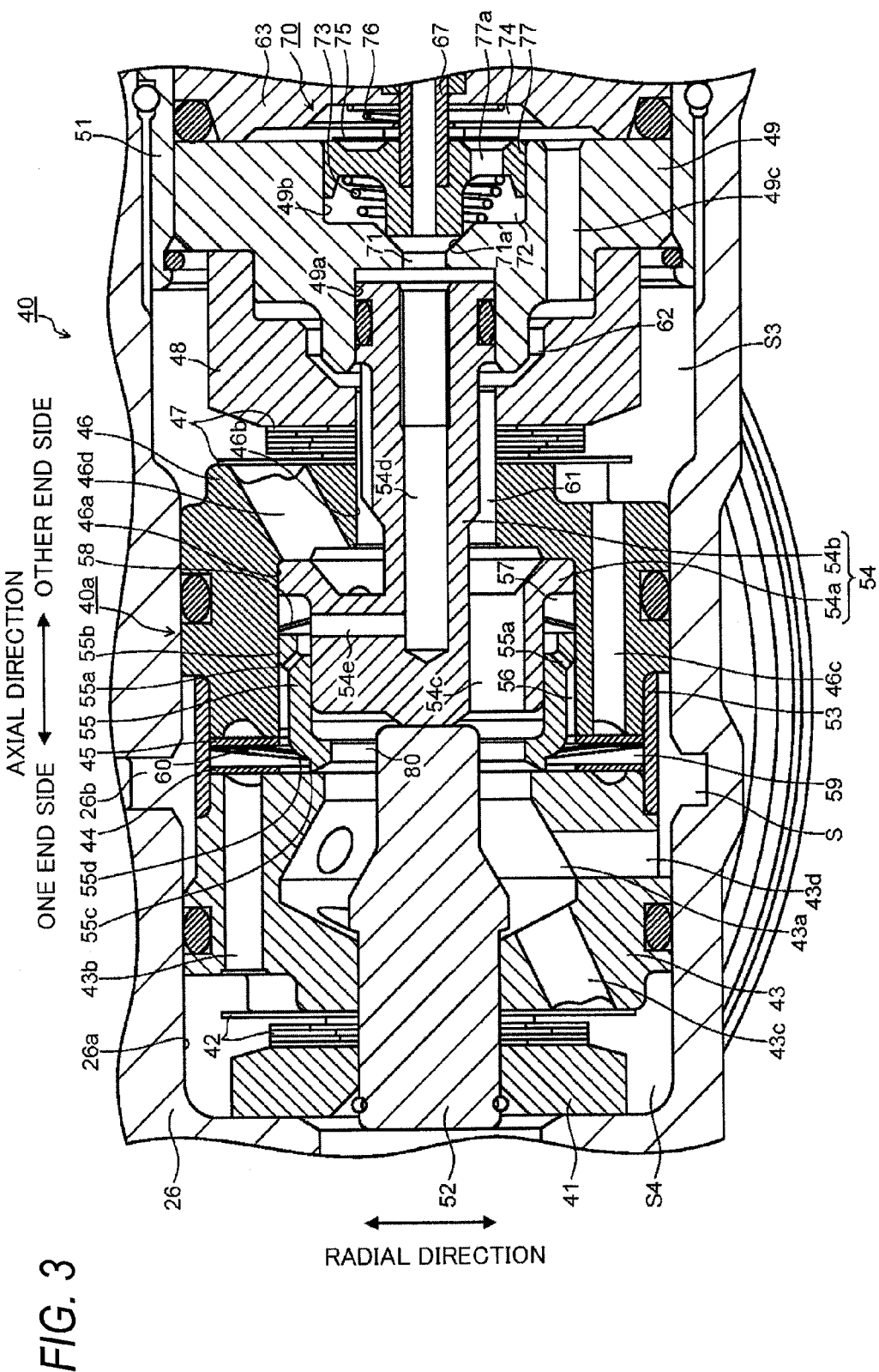
FIG. 3 is an enlarged detailed view of Part Y of FIG. 2.

FIG. 1 is a longitudinal sectional view of a shock absorber 1 in a first embodiment. FIG. 2 is an A-A sectional view of FIG. 1. FIG. 3 is an enlarged detailed view of Part Y of FIG. 2.

The shock absorber 1 in the first embodiment is an inverted rear cushion that suspends a rear wheel of a motorcycle on a vehicle body. In the shock absorber 1, as shown in FIG. 1, a part of a piston rod 3 attached to an axle side is inserted from below into an inside of a cylinder 2 attached to a vehicle body side. A not-shown suspension spring is interposed between the cylinder 2 and the piston rod 3.

The cylinder 2 is configured by an inner cylinder 2a and an outer cylinder 2b that form a concentric double tube. A damper case section 4 is attached to an upper end portion of the cylinder 2. A reservoir 30 and a damping-force generating device 40 explained below are provided in the damper case section 4. A part of the damper case section 4 configures a vehicle-body-side attaching section 24. A cylindrical rubber bush 5 is inserted through the vehicle-body-side attaching section 24 in a lateral direction (a left-right direction in FIG. 1) and held. A substantially cylindrical collar 6 is inserted through an inner side of the rubber bush 5 in the lateral direction and held. The upper end portion of the cylinder 2 is attached to the vehicle body of the motorcycle by a shaft inserted through the collar 6 inserted through the vehicle-body-side attaching section 24 and held.

An axle-side attaching member 7 is screwed on the lower end portion of the piston rod 3. Further, the axle-side attaching member 7 is firmly fixed by a lock nut 8. A lower end portion of the piston rod 3 is attached to a rear-wheel supporting member of the motorcycle via a shaft inserted through a cylindrical collar 9 inserted through the axle-side attachment member 7 in the lateral direction (the left-right direction in FIG. 1) and held. Note that, directly above the axle-side attachment member 7 at the lower end portion of the piston rod 3, a bump rubber 10 for preventing bottoming of the shock absorber 1 in a most compressed state is inserted through the piston rod 3 and fixed.

A piston 11 is attached to an upper end portion of the piston rod 3, which faces an inside of the inner cylinder 2a of the cylinder 2, by a nut 12. The piston 11 is fitted to be capable of sliding in the up-down direction on an inner circumference of the inner cylinder 2a via a piston ring 13 held on an outer circumference of the piston 11.

A space in the inner cylinder 2a of the cylinder 2 is sectioned into a piston-side oil chamber S1 on an upper side and a rod-side oil chamber S2 on a lower side by the piston 11. Oil, which is working fluid, is filled in the piston-side oil chamber S1 and the rod-side oil chamber S2.

As shown in FIG. 1, a cap 14 is attached to a portion through which the piston rod 3 is inserted in a lower surface opening section of the outer cylinder 2b of the cylinder 2. A rod guide 15, through a center of which the piston rod 3 pierces in the up-down direction to be capable of sliding, is fitted to an inner circumference at a lower end portion of the outer cylinder 2b. A rebound rubber 16 is fitted to an inner circumference of an upper end opening section of the rod guide 15. An oil seal 17 is fitted to an inner circumference of an intermediate portion of the rod guide 15. A dust seal 18 is fitted to an outer circumference of a lower end portion of the rod guide 15. Note that a leak of the oil from the cylinder 2 is prevented by sealing action of the oil seal 17, and that intrusion of dust into the cylinder 2 is prevented by sealing action of the dust seal 18.

In the damper case section 4, as shown in FIG. 1, an oil hole 19 opening to the piston-side oil chamber S1 formed in the inner cylinder 2a of the cylinder 2 is formed. The piston-side oil chamber S1 communicates with a first oil chamber S3 (see FIG. 2) of the damping-force generating device 40 explained below via the oil hole 19. A cylindrical channel 20 is formed between the inner cylinder 2a and the outer cylinder 2b of the cylinder 2. One end (a lower end) of the channel 20 communicates with the rod-side oil chamber S2 via a plurality of oil holes 21 formed at a lower end portion of the inner cylinder 2a. On the other hand, the other end (an upper end) of the channel 20 communicates with a second oil chamber S4 (see FIG. 2) of the damping-force generating device 40 explained below via a plurality of oil holes 22 formed at an upper end of the outer cylinder 2b and a channel 23 formed between the damper case section 4 and the outer cylinder 2b.

In the shock absorber 1 in the first embodiment, the damper case section 4 attached to an upper end of the cylinder 2 includes, as shown in FIG. 2, a damper case 25 and a damper case 26 and is provided on an outside of the cylinder 2. The reservoir 30 provided on an inside of the damper case 25 and the damping-force generating device 40 provided on an inside of the damper case 26 are provided in parallel. In FIG. 2, the damper case 25 and the damper case 26 are configured as a unit. However, not only this, but the damper case 25 and the damper case 26 may be separated.

The reservoir 30 includes, as shown in FIG. 2, a bag-like bladder 32 in a space defined by a bottomed cylindrical recess 25a of the damper case 25 and a chamber cap 31 attached to an opening section of the damper case 25. The bladder 32 is a member formed in a bag shape by an elastic body such as rubber and capable of expanding and contracting. An inner circumferential edge of an opening section of the bladder 32 is fitted to an outer circumference of the chamber cap 31 and held between the outer circumference of the chamber cap 31 and an inner circumference of the opening section of the damper case 25. Note that gas such as air is filled in an inside of the bladder 32. A space on an outside of the bladder 32 of the reservoir 30 configures a reservoir oil chamber S5. The oil, which is the working fluid, is filled in an inside of the reservoir oil chamber S5.

Details of a configuration of the damping-force generating device 40 are explained with reference to FIGS. 2 and 3.

The damping-force generating device 40 includes, as shown in FIG. 2, the bottomed cylindrical damper case 26 and a case 51, one end side of which is fitted to an inner circumference of an end opening section of the damper case 26. The damping-force generating device 40 sequentially includes a valve stopper 41, a compression-side outlet check valve 42, a valve seat member 43, an extension-side inlet check valve 44, a compression-side inlet check valve 45, a main valve member 46, an extension-side outlet check valve 47, a valve stopper 48, and a valve seat member 49 in the axial direction from one end side toward the other end side of a recess 26a of the damper case 26. In addition, the damping-force generating device 40 includes a rod 52 and a passage member 54 in a center of these members. Furthermore, the damping-force generating device 40 includes a solenoid section 50, which is an actuator, in the case 51 to be adjacent to the valve seat member 49. In the damping-force generating device 40 including the configuration explained above, a valve section 40a that generates a damping force and a back-pressure adjusting section 40b that adjusts the damping force generated by the valve section 40a are configured.

First, the valve section 40a is explained.

The valve section 40a includes, in order from one end side in the axial direction shown in FIG. 2, the compression-side outlet check valve 42, the valve seat member 43, the extension-side inlet check valve 44, a first pressure chamber PS1, the compression-side inlet check valve 45, a main valve 55, the main valve member 46, a distance collar 53, the extension-side outlet check valve 47, and a second pressure chamber PS2.

The rod 52 pierces through axis center portions of the valve stopper 41, the compression-side outlet check valve 42, and the valve seat member 43. The second oil chamber S4 sectioned by the valve seat member 43 is formed at an end portion on one end side in the recess 26a of the damper case 26. As explained above, the second oil chamber S4 communicates with the rod-side oil chamber S2 (see FIG. 1) via the channel 23, the oil holes 22, the channel 20, and the oil holes 21 (see FIG. 1).

In the valve seat member 43, a concave space 43a opening on the other end side is formed. In the valve seat member 43, a plurality of oil holes 43b piercing through in the axial direction, a plurality of oblique oil holes 43c opening to the space 43a, and a plurality of oil holes 43d in a radial direction opening to the space 43a are formed. The oil holes 43b are selectively opened and closed by the extension-side inlet check valve 44, and the oil holes 43c are selectively opened and closed by the compression-side outlet check valve 42. The compression-side outlet check valve 42 is formed by stacking a plurality of disk valves. The oil holes 43d are opened to an annular oil chamber S sectioned by the valve seat member 43, the main valve member 46, and the cylindrical distance collar 53 fitted between the valve seat member 43 and the main valve member 46 in the recess 26a of the damper case 26. The oil chamber S communicates with the reservoir oil chamber S5 of the reservoir 30 via a communication path 26b formed in the damper case 26.

On the inside of the main valve member 46, as shown in FIG. 3, recesses 46a and 46b having large and small different diameters are formed. The columnar passage member 54 having large and small different diameters is housed in the recesses 46a and 46b. The substantially cylindrical main valve 55, the other end of which projects to the outer circumferential side, is fitted to an outer circumference of a large-diameter section 54a of the passage member 54 to be capable of sliding in the axial direction.

An outer circumference of the other end of the main valve 55 is fitted to an inner circumference of the recess 46a on the large-diameter side of the main valve member 46 to be capable of sliding. An annular channel 56 is formed between an outer circumference of the main valve 55 and the inner circumference of the recess 46a on the large-diameter side of the main valve member 46. The main valve 55 opens and closes to thereby control a flow of the oil caused by sliding of the piston 11 in the cylinder 2 and generate a damping force. In the shock absorber 1 in the embodiments, the main valve 55 is formed in a substantially cylindrical shape. The main valve 55 opens a gap between the main valve 55 and the valve seat member 43 by the main valve 55 being spaced from the valve seat member 43 to the other end side in the axial direction and the main valve 55 closes the gap therebetween by the main valve 55 being seated on the valve seat member 43 at one end side in the axial direction, which enable circulation of the oil from a gap 59 to a gap 80. Therefore, in the main valve 55, an outer circumference of a seating section 55c on one end side needs to be present further on the inner side than an outer circumference of a guide surface 55b on the other end side slid by the recess 46a of the main valve member 46 such that the main valve 55 is capable of opening to the other end side in the axial direction. That is, in the main valve 55, an outer circumference on one end side in the axial direction is present further on the inner side than an outer circumference on the other end side in the axial direction. Consequently, a lower surface 55d forms a part of a pressure receiving area for a hydraulic pressure of the gap 59, which is the first pressure chamber PS1, and thus the main valve 55 receives a valve opening pressure to the other end side in the axial direction.

In the main valve member 46, an oil hole 46c piercing through in the axial direction and an oblique oil hole 46d are formed. In the large-diameter section 54a of the passage member 54, an oil hole 54c piercing through in the axial direction is formed. In a small-diameter section 54b of the passage member 54, an oil hole 54d extending in the axial direction is formed. In the large-diameter section 54a of the passage member 54, an oil hole 54e extending from the oil hole 54d outward in the radial direction and opening to a pilot chamber 57 explained below is formed.

In an intermediate portion in the axial direction in the recess 26a of the damper case 26, the annular first oil chamber S3 defined by the main valve member 46, the valve stopper 48, and the valve seat member 49 is formed.

As explained above, the gap 59 is formed in a space surrounded by the distance collar 53, the valve seat member 43, the main valve member 46, and the main valve 55. The extension-side inlet check valve 44 and the compression-side inlet check valve 45 are provided in the gap 59. The extension-side inlet check valve 44 and the compression-side inlet check valve 45 are urged by a leaf spring 60, which is interposed between the extension-side inlet check valve 44 and the compression-side inlet check valve 45, in directions for respectively closing the oil holes 43b of the valve seat member 43 and the oil hole 46c of the main valve member 46. Note that the oil holes 43b of the valve seat member 43 are always opened to the second oil chamber S4, and that the oil hole 46c of the main valve member 46 is always opened to the first oil chamber S3.

The oil hole 46d obliquely formed in the main valve member 46 communicates with the oil hole 54c of the passage member 54 and is selectively opened and closed by the extension-side outlet check valve 47.

On an outer circumferential side of the small-diameter section 54b of the passage member 54, a channel 61 formed among the main valve member 46, the extension-side outlet check valve 47, and the valve stopper 48 extends in the axial direction. The channel 61 communicates with a step-like channel 62 formed between the valve stopper 48 and the valve seat member 49.

As shown in FIG. 3, the first pressure chamber PS1 is formed by the gap 59 and the channel 56. On the other hand, the second pressure chamber PS2 includes the gap 80 formed by the valve seat member 43, the passage member 54, the main valve 55, and the rod 52, the oil holes 43c, the space 43a, the oil hole 54c, the channel 61, the oil hole 46d, the channel 62, an oil hole 49c, a space 74, an oil hole 77a, and a space 72. The first pressure chamber PS1 and the second pressure chamber PS2 are partitioned by the main valve 55 serving as a boundary. The compression-side inlet check valve 45 and the extension-side inlet check valve 44 allow only inflow of the oil into the first pressure chamber PS1. The compression-side outlet check valve 42 and the extension-side outlet check valve 47 allow only outflow of the oil from the second pressure chamber PS2. The first pressure chamber PS1 and the second pressure chamber PS2 are formed in a substantially double ring shape. In the shock absorber 1 in the embodiments, the first pressure chamber PS1 is on an outer annular side and the second pressure chamber PS2 is on an inner annular side. However, not only this, but in the structure in which the first pressure chamber PS1 and the second pressure chamber PS2 are formed in the substantially double ring shape, the first pressure chamber PS1 may be on the inner annular side and the second pressure chamber PS2 may be on the outer annular side. Note that, the oil hole 49c, the space 74, the oil hole 77a, and the space 72 are explained more in detail below.

Next, the back-pressure adjusting section 40b is explained.

The back-pressure adjusting section 40b includes an oil hole 55a of the main valve 55, the pilot chamber 57, a leaf spring 58, the passage member 54, the valve stopper 48, an oil hole 71 of the valve seat member 49, and a damping-force adjusting section 70.

The oil hole 55a is formed in the main valve 55 and allows the channel 56 formed on the outer circumference of the main valve 55 and the pilot chamber 57 to communicate with each other. The pilot chamber 57 has an annular shape and is formed by being sectioned by the main valve 55 and the large-diameter section 54a of the passage member 54 on a rear side (the other end side in FIG. 3) of the main valve 55 in the recess 46a on the large-diameter side of the main valve member 46. The leaf spring 58 is housed in the pilot chamber 57 and urges the main valve 55 to a valve closing side (a side on which the seating section 55c on one end side of the main valve 55 is seated on an end face of the valve seat member 43). The pilot chamber 57 causes an internal pressure in a valve closing direction to act on the main valve 55 with a pressure of the oil branching from the first pressure chamber PS1.

The small-diameter section 54b of the passage member 54 pierces through the axis center portions of the main valve member 46, the extension-side outlet check valve 47, and the valve stopper 48 and fits in a recess 49a of the valve seat member 49. Note that, on an outer circumference side of the small-diameter section 54b of the passage member 54, the channel 61 is formed as explained above.

As shown in FIGS. 2 and 3, the damping-force adjusting section 70 is configured in a valve mechanism including the valve seat member 49, a spring 73, a valve body 77, a fail-safe valve 75, a spring 76, and the solenoid section 50. The valve body 77 and the fail-safe valve 75 function as a damping-force adjusting valve. For example, when the valve body 77 is seated on the valve seat member 49, the valve body 77 functions as the damping-force adjusting valve. For example, the valve body 77 is spaced from the valve seat member 49, the valve body 77 and the fail-safe valve 75 function as the damping-force adjusting valve. In this case, the damping force is adjusted mainly by the valve body 77. For example, when the valve body 77 is spaced from the valve seat member 49 and the other end side of the valve body 77 moves in a valve opening direction most, the fail-safe valve 75 functions as the damping-force adjusting valve. In any case, the damping-force adjusting valve including the valve body 77 and the fail-safe valve 75 is provided on a pilot channel explained below and adjusts the internal pressure of the pilot chamber 57.

The solenoid section 50 included in the damping-force adjusting section 70 includes, a core 63, an actuation rod 67, a plunger 66, a coil 65, and a core 64.

The solenoid section 50 is configured by housing, the two bottomed cylindrical cores 63 and 64, the annular coil 65, the plunger 66 housed on an inside of the cores 63 and 64, the hollow actuation rod 67 that pierces through an axial center portion of the plunger 66, and the like on an inside of the cylindrical case 51. Both the end portions in the axial direction of the actuation rod 67 are supported to be movable in the axial direction by cylindrical guide bushes 68 and 69. The valve body 77 is attached to an outer circumference on one end side of the actuation rod 67, which faces an inside of a recess 49b of the valve seat member 49.

As shown in FIG. 3, the valve body 77 is fitted in an inner circumference of the recess 49b of the valve seat member 49 to be movable in the axial direction. The valve body 77 is selectively seated on a taper-like valve seat 71a of the oil hole 71 formed in the axial center portion of the valve seat member 49 to thereby open and close the oil hole 71. In the recess 49b of the valve seat member 49, the space 72 sectioned by the valve body 77 is formed. In the space 72, the spring 73 (corresponding to a third elastic body) that urges the valve body 77 in the valve opening direction (the other end side in FIG. 3) is housed. The space 72 formed in the valve seat member 49 communicates with the pilot chamber 57 via the oil hole 71 of the valve seat member 49, the oil holes 54d and 54e of the passage member 54. The oil hole 77a is pierced through the valve body 77. The oil hole 77a is always opened to the space 72.

On an end face on one end side of the core 63 of the solenoid section 50, the step-like concave space 74 is formed between the end face and the valve seat member 49. In the space 74, the fail-safe valve 75 that selectively opens and closes the oil hole 77a of the valve body 77 is provided. The fail-safe valve 75 is held on an outer circumference of the actuation rod 67 to be capable of sliding in the axial direction and is urged in the valve closing direction (one end side in FIG. 3) by the spring 76 (equivalent to the first elastic body) housed in the space 74. Note that a modulus of elasticity of the spring 76 is set smaller than a modulus of elasticity of the spring 73 that urges the valve body 77 in the valve opening direction.

In this embodiment, the fail-safe valve 75 is configured by a disk valve. A modulus of elasticity of the fail-safe valve 75 functioning as the disk valve is set larger than the modulus of elasticity of the spring 76 that urges the fail-safe valve 75 in the valve closing direction (one end side in FIG. 3). Therefore, at a normal time (other than a failure time), when a hydraulic pressure is applied in a direction in which the fail-safe valve 75 is opened, the fail-safe valve 75 moves to the valve opening side in the axial direction resisting an urging force of the spring 76, whereby the oil hole 77a is opened. In a state in which the hydraulic pressure is not applied in the direction in which the fail-safe valve 75 is opened, by being urged by the spring 76, the fail-safe valve 75 comes into contact with an end portion on the downstream side (the other end side in FIG. 3) of the valve body 77 and closes the oil hole 77a to thereby prevent the oil from flowing back. That is, the fail-safe valve 75 performs a function of a check valve at the normal time.

Figure 8:
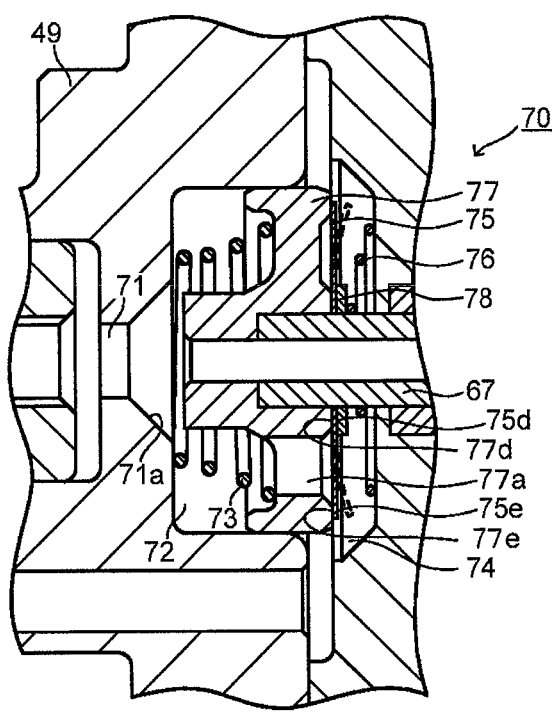
FIG. 8 is a main part enlarged detailed view showing a state of a fail-safe valve at a failure time.

For example, at the failure time when energization to the coil 65 of the solenoid section 50 is interrupted and the solenoid section 50 does not generate thrust, as shown in FIG. 8, which is a sectional view of a main part showing a state of the fail-safe valve 75 at the failure time, since the modulus of elasticity of the spring 73 that urges the valve body 77 in the valve opening direction is larger than the modulus of elasticity of the spring 76 that urges the fail-safe valve 75 in the valve closing direction, the valve body 77 moves in the valve opening direction (the other end side in FIG. 8) and changes to a full-open state. The spring 76 is flattened and an inner circumferential portion 75d of the fail-safe valve 75 is held and fixed between a spring receiving sheet 78 provided on one end side of the spring 76 and a supporting portion 77d of the valve body 77. Therefore, in this state, since the oil hole 77a is closed by the fail-safe valve 75, a situation in which the hydraulic pressure drops and the damping force suddenly decreases is prevented. In this state, when the hydraulic pressure is applied in a direction in which the fail-safe valve 75 is opened, as indicated by a dotted line in FIG. 8, an outer circumferential portion 75e of the fail-safe valve 75 is not supported. The non-supported outer circumferential portion 75e bends to be spaced from a non-supporting portion 77e, which is a portion other than the supporting portion 77d, of the valve body 77, whereby the oil hole 77a opens and the oil flows.

Figure 10A:
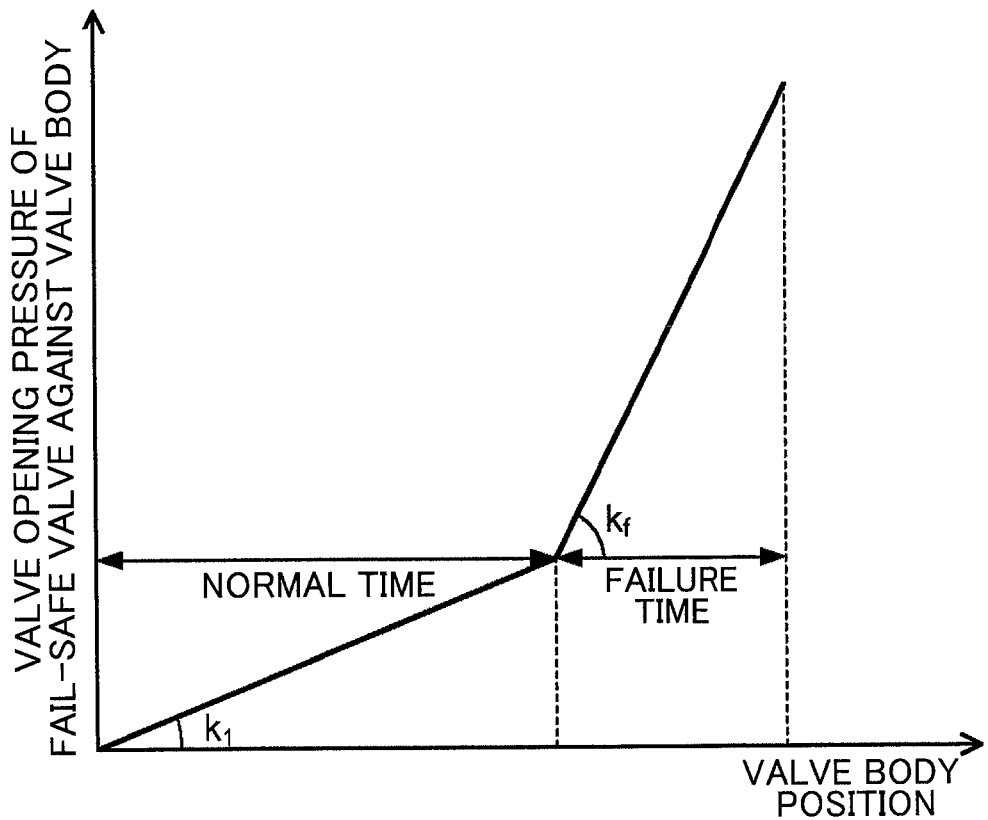
FIGS. 10A and 10B are diagrams showing a relation between modulus of elasticity of a spring that urges the fail-safe valve and the fail-safe valve.
Figure 10B:
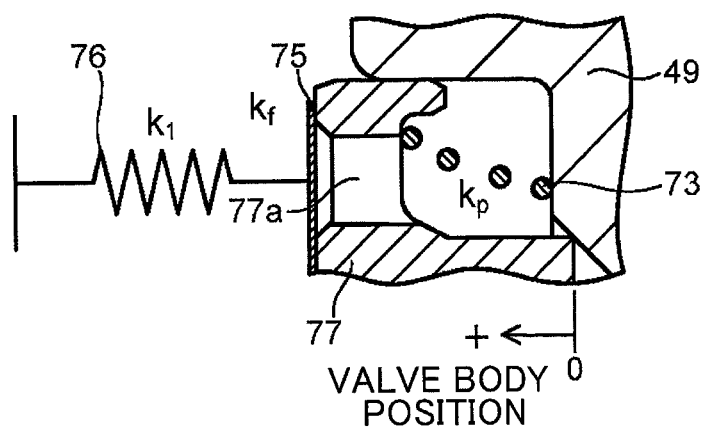

Therefore, as shown in FIG. 10A showing a relation between a position of the valve body 77 and a valve opening pressure of the fail-safe valve 75 against the valve body 77, a combined elastic body, a modulus of elasticity of which substantially changes in multiple states (two stages or more), is formed by the fail-safe valve 75 functioning as the disk valve and the spring 76 that urges the fail-safe valve 75 in the valve closing direction. When the modulus of elasticity of the fail-safe valve 75 is represented as kf and the modulus of elasticity of the spring 76 is represented as k1, in the first embodiment, the moduli of elasticity are set in a relation of k1<<kf. Therefore, at the normal time, the fail-safe valve 75 can be substantially regarded as a rigid body, and a valve closing pressure of the fail-safe valve 75 depends on the modulus of elasticity k1 of the spring 76. When the hydraulic pressure of the oil hole 77a (and the spring) does not reach a valve opening pressure opposite to the valve closing pressure, the fail-safe valve 75 functions as a check valve. On the other hand, at the failure time, since the thrust of the solenoid section 50 disappears, the spring 76 is flattened by the spring 73 and does not function as a spring. Therefore, the fail-safe valve 75 functions as a fail-safe valve at the modulus of elasticity kf of the fail-safe valve 75 itself. In FIG. 10B schematically showing a relation between the position of the valve body 77 and a modulus of elasticity acting on the fail-safe valve 75, Kp represents the modulus of elasticity of the spring 73 that urges the valve body 77 in the valve opening direction. In this case, k1<Kp.

In the damping-force generating device 40 configured as explained above, the oil hole 46c of the main valve member 46, the gap 59, the gap 80, and the space 43a and the oil hole 43c of the valve seat member 43 configure a main channel during the compression side stroke. In the main channel of the compression side stroke, the compression-side inlet check valve 45, the main valve 55, and the compression-side outlet check valve 42 are provided. On the other hand, the oil holes 43b formed in the valve seat member 43, the gap 59, the gap 80, the oil hole 54c formed in the passage member 54, and the oil hole 46d formed in the main valve member 46 configure a main channel during the extension side stroke. In the main channel of the extension side stroke, the extension-side inlet check valve 44, the main valve 55, and the extension-side outlet check valve 47 are provided.

Figure 4:
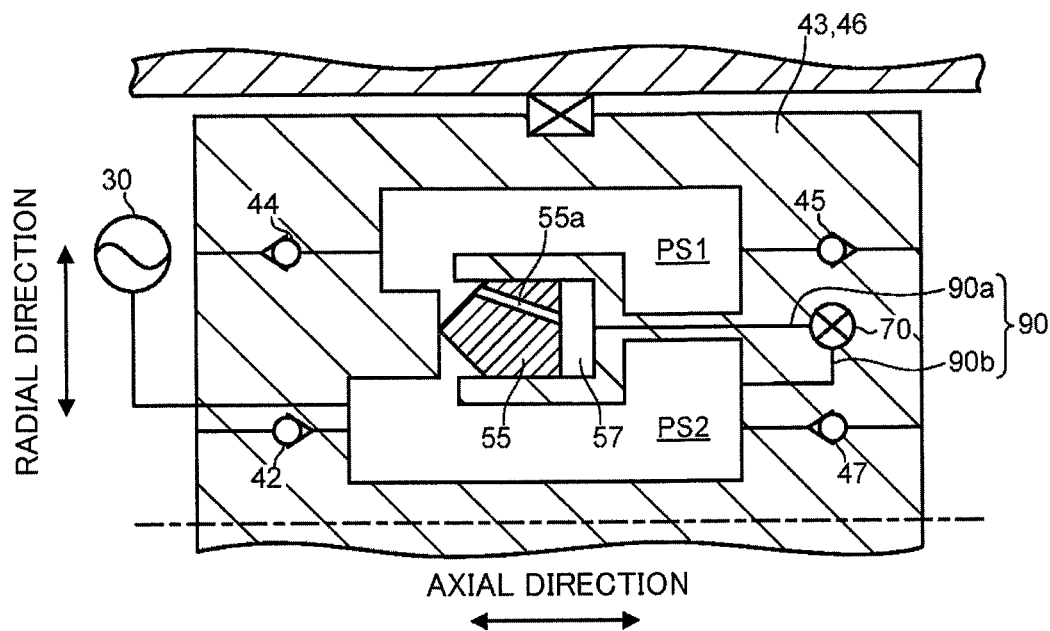
FIG. 4 is a schematic diagram showing a schematic configuration of a damping-force generating device of the shock absorber in the first embodiment.

The pilot channel 90 during the compression side stroke includes an upstream-side pilot channel 90a and a downstream-side pilot channel 90b (see FIG. 4). The upstream-side pilot channel 90a is configured by the oil hole 55a, the pilot chamber 57, the oil hole 54e, the oil hole 54d, and the oil hole 71. The downstream-side pilot channel 90b is configured by the space 72, the oil hole 77a, the space 74, the oil hole 49c, the channel 62, and the channel 61. At the failure time, the space 72 and the oil hole 77a are added to the upstream-side pilot channel 90a. On the other hand, the space 72 and the oil hole 77a are excluded from the downstream-side pilot channel 90b. When the valve body 77 is spaced from the valve seat 71a, the valve body 77 is interposed in the pilot channel 90. Note that a portion configured by the space 72, the oil hole 77a, the space 74, the oil hole 49c, the channel 62, and the channel 61 in the downstream-side pilot channel 90b also functions as a part of the second pressure chamber PS2.

In the extension side stroke, as in the compression-side stroke, the pilot channel 90 includes the upstream-side pilot channel 90a and the downstream-side pilot channel 90b (see FIG. 4). The upstream-side pilot channel 90a is configured by the oil hole 55a, the pilot chamber 57, the oil hole 54e, the oil hole 54d, and the oil hole 71. The downstream-side pilot channel 90b is configured by the space 72, the oil hole 77a, the space 74, the oil hole 49c, the channel 62, and the channel 61. At the failure time, the space 72 and the oil hole 77a are added to the upstream-side pilot channel 90a. On the other hand, the space 72 and the oil hole 77a are excluded from the downstream-side pilot channel 90b. When the valve body 77 is spaced from the valve seat 71a, the valve body 77 is interposed in the pilot channel. Note that a portion configured by the space 72, the oil hole 77a, the space 74, the oil hole 49c, the channel 62, and the channel 61 in the downstream-side pilot channel 90b also functions as a part of the second pressure chamber PS2.

The schematic configuration of the damping-force generating device 40 is explained with reference to FIGS. 4 and 5.

FIG. 4 is a schematic diagram showing the schematic configuration of the damping-force generating device of the shock absorber 1 in the first embodiment. FIG. 5 is a hydraulic circuit diagram of the shock absorber 1 in the first embodiment. Note that, in FIG. 4, the pilot channel is denoted by reference numeral 90, the upstream-side pilot channel constituting the pilot channel is denoted by reference sign 90a, and the downstream-side pilot channel constituting the pilot channel is denoted by reference sign 90b.

An alternate long and short dash line shown in FIG. 4 is a center line in the axial direction of the damping-force generating device 40.

As shown in FIG. 4, in the damping-force generating device 40 in the first embodiment, on an inside of the valve seat member 43 and the main valve member 46, the annular first pressure chamber PS1 is formed on a radially outer side (an outer ring side) of the valve seat member 43 and the main valve member 46 with the main valve 55 serving as a boundary. The annular second pressure chamber PS2 is formed on a radially inner side (an inner ring side) of the first pressure chamber PS1 with the main valve 55 serving as the boundary. The first pressure chamber PS1 and the second pressure chamber PS2 form a substantially double ring shape and overlap each other in the radial direction. However, not only this, but in the structure in which the first pressure chamber PS1 and the second pressure chamber PS2 are the substantially double ring shape, the first pressure chamber PS1 may be on the inner ring side, and the second pressure chamber PS2 may be on the outer ring side.

As explained above, the first pressure chamber PS1 is configured by the gap 59 and the channel 56 (see FIGS. 2 and 3). As explained above, the second pressure chamber PS2 is configured by the oil holes 43c, the space 43a, the gap 80, the oil hole 54c, the channel 61, the oil hole 46d, the channel 62, the oil hole 49c, the space 74, the oil hole 77a, and the space 72 (see FIGS. 2 and 3). The compression-side inlet check valve 45 and the extension-side inlet check valve 44 that allow only the inflow of the oil into the first pressure chamber PS1 in the compression side stroke and the extension side stroke are connected to the first pressure chamber PS1. The compression-side outlet check valve 42 and the extension-side outlet check valve 47 that allow only the outflow of the oil from the second pressure chamber PS2 in the compression side stroke and the extension side stroke are connected to the second pressure chamber PS2.

As shown in FIG. 4, the pilot channel 90 extended from the oil hole 55a via the pilot chamber 57 is connected to the second pressure chamber PS2. Note that, as explained above, the downstream-side pilot channel 90b also functions as a part of the second pressure chamber PS2. The damping-force adjusting section 70 is interposed in the pilot channel 90. The reservoir 30 is connected to the second pressure chamber PS2. Note that the pilot chamber 57 communicates with the first pressure chamber PS1 via the oil hole 55a formed in the main valve 55.

Figure 5:
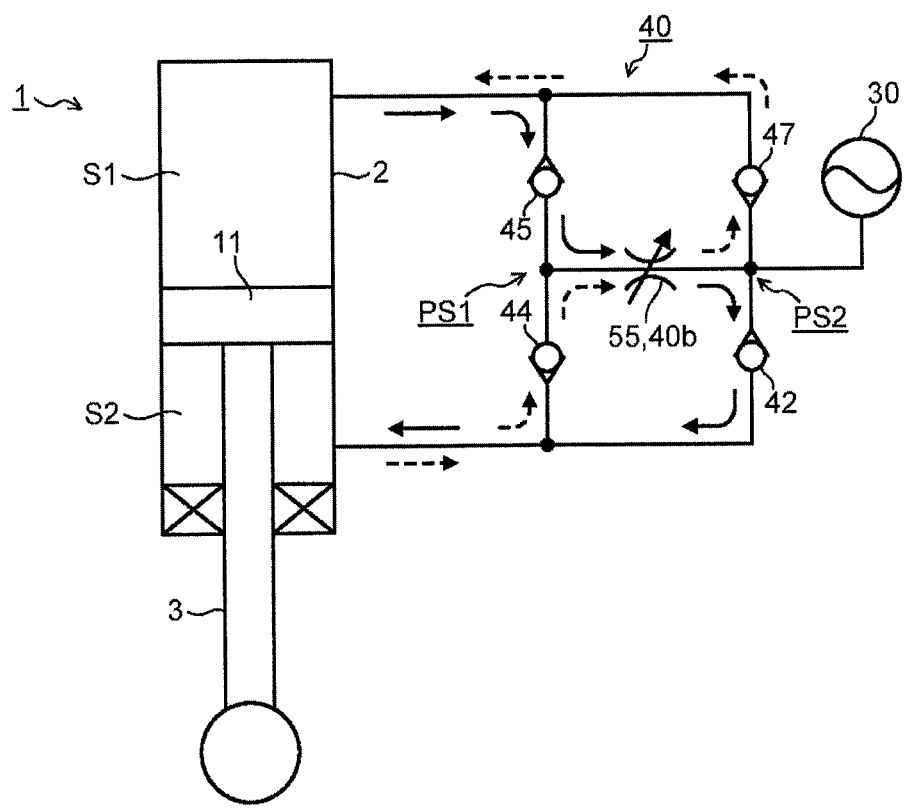
FIG. 5 is a hydraulic circuit diagram of the shock absorber in the first embodiment.

A hydraulic circuit includes, as shown in FIG. 5, the main valve 55, the back-pressure adjusting section 40b, the compression-side inlet check valve 45, the compression-side outlet check valve 42, the extension-side inlet check valve 44, the extension-side outlet check valve 47, and the reservoir 30. Note that, in FIG. 5, components same as the components explained above are denoted by the same reference numerals and signs. The main valve 55, the compression-side inlet check valve 45, the compression-side outlet check valve 42, the extension-side inlet check valve 44, the extension-side outlet check valve 47, the first pressure chamber PS1, and the second pressure chamber PS2 are included in the valve section 40a. Note that, in the hydraulic circuit, the damping-force generating device 40 and the reservoir 30 are provided on an outside of the piston 11 and further on an outside of the cylinder 2.

The reservoir 30 communicates with an oil path divided on a downstream side of the main valve 55 and the back-pressure adjusting section 40b. In this way, the oil path communicating with the reservoir 30 is divided on the downstream side of the main valve 55 and the back-pressure adjusting section 40b. Consequently, the oil after being damped by the main valve 55 is led into the reservoir 30. That is, the pressure of the rod-side oil chamber S2 substantially depends on only a pressure of a not-shown air chamber present in the reservoir 30 (a space on the inside of the bladder 32 shown in FIG. 2) and does not vary with setting of the channel resistance of the main valve 55. Therefore, it is possible to avoid a pause of the damping force during reversal from the compression side stroke to the extension side stroke. In FIG. 5, a flow of the oil during the compression side stroke is indicated by a solid line, and a flow of the oil during the extension side stroke is indicated by a broken line. Note that a flow of the oil in the hydraulic circuit shown in FIG. 5 is explained when action of the shock absorber is explained below.

Action of the Shock Absorber

Figure 6:
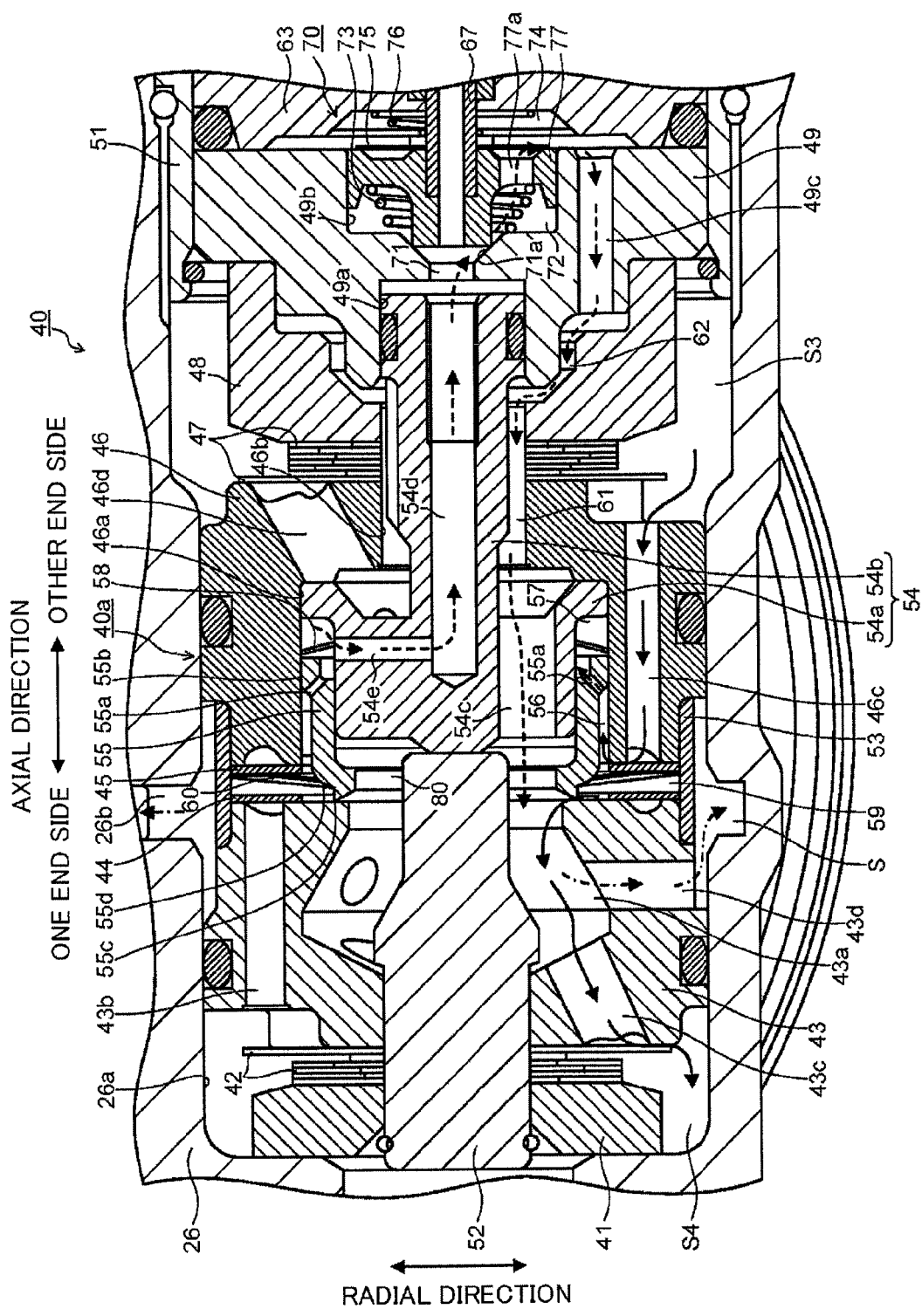
FIG. 6 is an enlarged detailed view of Part Y of FIG. 2 showing a flow of oil during a compression side stroke in the damping-force generating device of the shock absorber in the first embodiment.
Figure 7:
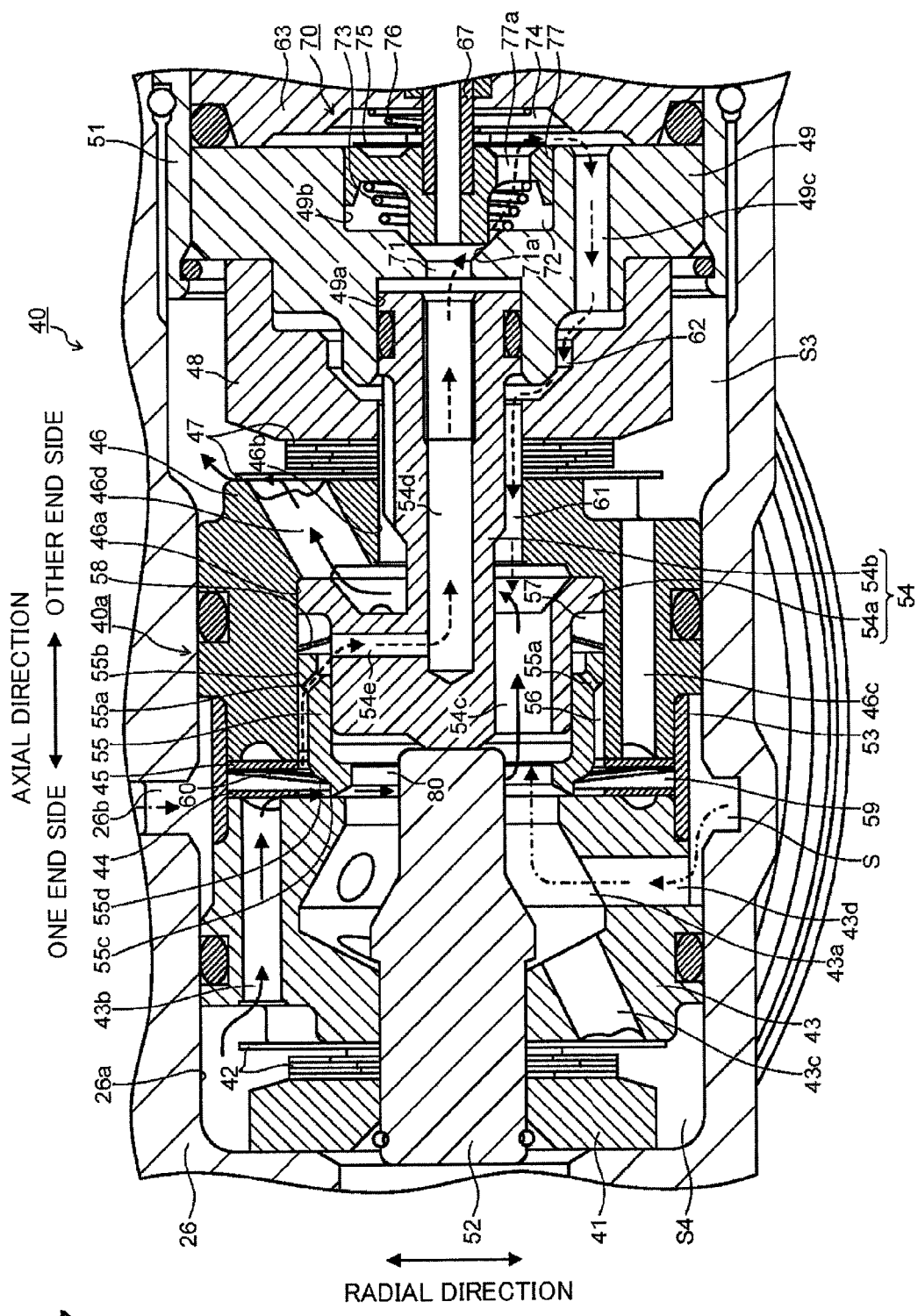
FIG. 7 is an enlarged detailed view of Part Y of FIG. 2 showing a flow of the oil during an extension side stroke in the damping-force generating device of the shock absorber in the first embodiment.

The action of the shock absorber 1 configured as explained above during the compression side stroke and the extension side stroke is explained with reference to FIGS. 6 and 7. Note that FIG. 6 is an enlarged detailed view of Part Y showing a flow of the oil during the compression side stroke in the damping-force generating device 40 of the shock absorber 1 in the first embodiment. FIG. 7 is an enlarged detailed view of Part Y showing a flow of the oil during the extension side stroke in the damping-force generating device 40 of the shock absorber 1 in the first embodiment.

(1-1) Compression Side Stroke

When the rear wheel moves up and down following unevenness of a road surface during traveling of the motorcycle, the cylinder 2 and the piston rod 3 of the shock absorber 1, which suspends the rear wheel, extend and contract. In the compression side stroke in which the piston rod 3 moves upward relatively to the cylinder 2, the oil in the piston-side oil chamber S1 is compressed by the piston 11 and the pressure in the piston-side oil chamber S1 increases. Then, the oil in the piston-side oil chamber S1 is supplied through the oil hole 19 shown in FIG. 1 to the first oil chamber S3 of the damping-force generating device 40 shown in FIGS. 2 and 3.

The oil supplied to the first oil chamber S3 of the damping-force generating device 40 passes through the main channel during the compression side stroke and flows into the second oil chamber S4. Specifically, as indicated by solid line arrows in FIG. 6, the oil passes through the oil hole 46c of the main valve member 46 from the first oil chamber S3, pushes the compression-side inlet check valve 45 open resisting the urging force of the leaf spring 60, and flows to the gap 59. When the oil flowed into the gap 59 flows through the gap between the main valve 55 and the valve seat member 43, the oil pushes the main valve 55 open resisting a force in the valve closing direction caused by the leaf spring 58 and a back pressure of the pilot chamber 57 and flows into the gap 80 and the space 43a of the valve seat member 43 from the gap 59.

The oil flowed into the space 43a passes through the oil holes 43c, pushes the compression-side outlet check valve 42 open, and flows into the second oil chamber S4. The oil flowed into the second oil chamber S4 flows into the rod-side oil chamber S2 from the second oil chamber S4 through the channel 23, the oil holes 22 formed in the outer cylinder 2b of the cylinder 2, the channel 20 between the inner cylinder 2a and the outer cylinder 2b, and the oil holes 21 formed in the inner cylinder 2a shown in FIG. 1. At this point, a main compression side damping force is generated in the shock absorber 1 by flow resistance caused when the oil passes through the main valve 55. The flow of the oil at this point is indicated by solid line arrows in the hydraulic circuit shown in FIG. 5. Note that, for example, by stacking a plurality of disk valves in the compression-side outlet check valve 42, a compression side damping force may be auxiliarily generated in the compression-side outlet check valve 42 in addition to the main compression side damping force generated in the main valve 55.

A part of the oil passed through the oil hole 46c of the main valve member 46 from the first oil chamber S3 and flowed into the gap 59 passes through the pilot channel and merges into the oil flowing through the main channel. Specifically, as indicated by broken line arrows in FIG. 6, a part of the oil passed through the oil hole 46c of the main valve member 46 from the first oil chamber S3 and flowed into the gap 59 passes through the oil hole 55a of the main valve 55 from the channel 56 on the outer circumference side of the main valve 55 and flows into the pilot chamber 57.

The oil flowed into the pilot chamber 57 passes through the oil holes 54e and 54d of the passage member 54, the oil hole 71 of the valve seat member 49, and a gap between the valve body 77 and the valve seat 71a and flows into the space 72 of the valve seat member 49. The oil flowed into the space 72 of the valve seat member 49 passes through the oil hole 77a formed in the valve body 77, pushes the fail-safe valve 75 open resisting an urging force of the spring 76, and flows into the space 74 of the core 63. The oil flowed into the space 74 passes through the oil hole 49c of the valve seat member 49, the channels 62 and 61, and the oil hole 54c of the passage member 54 and merges into the oil flowing through the main channel.

In this case, the fail-safe valve 75 functions as a check valve and prevents a backflow of the oil from the space 74 to the space 72 side. As explained above, the modulus of elasticity of the fail-safe valve 75 is set larger than the modulus of elasticity of the spring 76. Therefore, the fail-safe valve 75 slides to the other end side in the axial direction shown in FIG. 6 resisting the urging force of the spring 76 without bending and opens the oil hole 77a of the valve body 77.

An opening degree of the valve body 77 (a valve opening pressure of the valve body 77) can be changed by changing an electric current supplied to the coil 65 of the solenoid section 50 to adjust the thrust generated in the solenoid section 50 and thereby controlling a pressing force to the valve seat 71a of the valve body 77. In this way, the flow resistance of the oil passing through the gap between the valve body 77 and the valve seat 71a is adjusted by changing the supply current to the coil 65 of the solenoid section 50 to adjust the opening degree of the valve body 77. Consequently, it is possible to adjust an internal pressure of the upstream-side pilot channel configuring the channel from the oil hole 55a to the oil hole 71. It is also possible to adjust an internal pressure (the back pressure) of the pilot chamber 57 by adjusting an internal pressure of the upstream-side pilot channel. As a result, it is possible to control the force for pressing the main valve 55 in the valve closing direction due to the internal pressure (the back pressure) of the pilot channel 57 and thus adjust the opening degree of the main valve 55. By adjusting the opening degree of the main valve 55 in this way, it is possible to adjust the compression side damping force generated by the flow resistance of the oil passing through the main valve 55. That is, at the normal time, the valve body 77 functions as the damping-force adjusting valve.

Specifically, when the supply current to the coil 65 is small, the pressing force to the valve seat 71a of the valve body 77 caused by the thrust of the solenoid section 50 is small, and thus the valve opening pressure of the valve body 77 is also small. Therefore, the opening degree of the valve body 77 increases, the flow resistance of the oil flowing in the valve body 77 decreases, and the internal pressure of the pilot chamber 57 (the pressure in the valve closing direction of the main valve 55) also decreases. As a result, the opening degree of the main valve 55 increases, the flow resistance of the oil flowing in the main valve 55 decreases, and the compression side damping force generated by the flow resistance also decreases.

Conversely, when the supply current to the coil 65 is large, the pressing force to the valve seat 71a of the valve body 77 caused by the thrust of the solenoid section 50 is large, and thus the valve opening pressure of the valve body 77 is also large. Therefore, the opening degree of the valve body 77 decreases, the oil flowing in the valve body 77 is throttled and the flow resistance of the oil increases, and the internal pressure of the pilot chamber 57 also increases. As a result, the opening degree of the main valve 55 decreases, the flow resistance of the oil flowing in the main valve 55 increases, and the compression side damping force generated by the flow resistance also increases.

Figure 9:
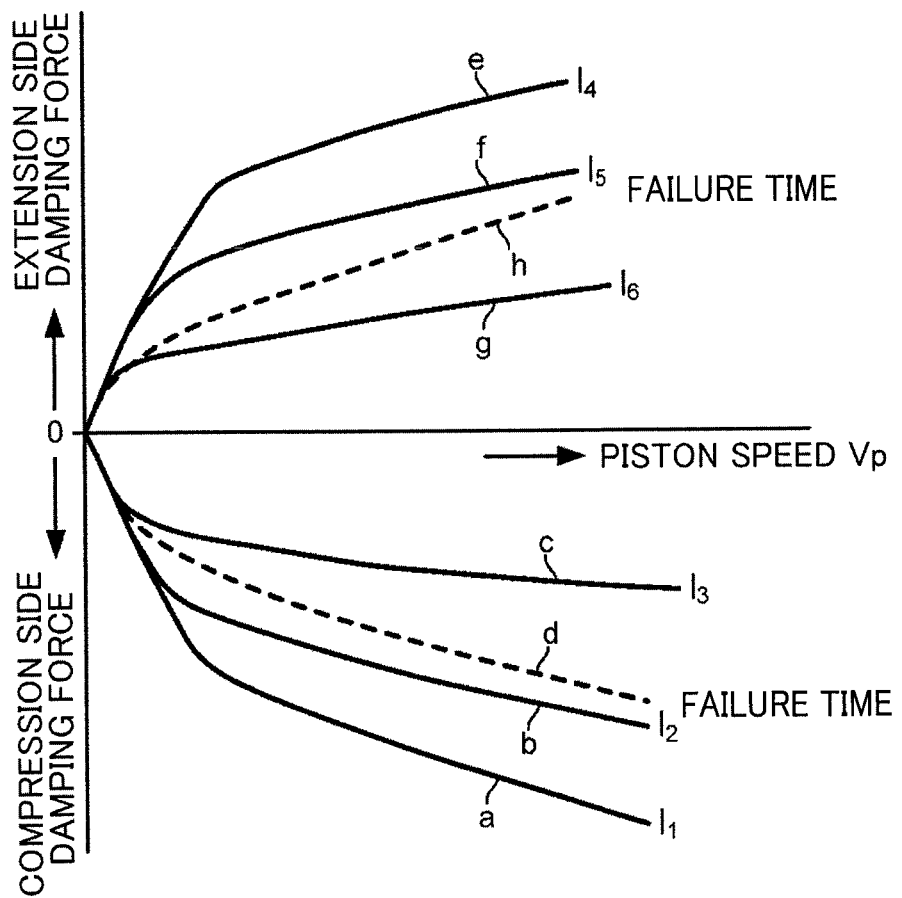
FIG. 9 is a diagram showing changes in a compression side damping force and an extension side damping force with respect to piston speed using a supply current to a coil as a parameter.

In FIG. 9, a change in the compression side damping force with respect to piston speed Vp is shown using the supply current to the coil 65 as a parameter. The compression side damping forces at the time when the supply current to the coil 65 is $I_1$, $I_2$, and $I_3$ ($I_1 > I_2 > I_3$) are indicated by curves a, b, and c. The compression side damping force is larger as the supply current is larger.

In the compression side stroke, an amount of the oil equivalent to a volume of the piston rod 3 entering the inner cylinder 2a of the cylinder 2 passes through the oil holes 43d of the valve seat member 43 and flows into the oil chamber S as indicated by chain line arrows in FIG. 6. The oil flowed into the oil chamber S is supplied to the reservoir oil chamber S5 (see FIG. 2) of the reservoir 30 through the communication path 26b. Therefore, the bladder 32 of the reservoir 30 contracts, and the gas therein is compressed. According to the compression of the gas, a capacity change in the inner cylinder 2a involved in an entry of the piston rod 3 into the inner cylinder 2a of the cylinder 2 is compensated.

(1-2) Extension Side Stroke

Action during the extension side stroke of the shock absorber 1 is explained with reference to FIG. 7.

In the extension side stroke in which the piston rod 3 moves downward relatively to the cylinder 2, the piston 11 moves downward in the inner cylinder 2a of the cylinder 2 together with the piston rod 3. Therefore, the oil in the rod-side oil chamber S2 is compressed by the piston 11, and the pressure in the rod-side oil chamber S2 increases. Then, the oil in the rod-side oil chamber S2 is supplied to the second oil chamber S4 of the damping-force generating device 40 shown in FIGS. 2 and 3 through the oil holes 21 formed in the inner cylinder 2a, the channel 20 between the inner cylinder 2a and the outer cylinder 2b, and the oil holes 22 formed in the outer cylinder 2b and the channel 23 shown in FIG. 1.

The oil supplied to the second oil chamber S4 of the damping-force generating device 40 passes through the main channel during the extension side stroke and flows into the first oil chamber S3. Specifically, as indicated by solid line arrows in FIG. 7, the oil passes through the oil holes 43b of the valve seat member 43 from the second oil chamber S4, pushes the extension-side inlet check valve 44 open resisting the urging force of the leaf spring 60, and flows to the gap 59. The oil flowed into the gap 59 pushes the main valve 55 open resisting the force in the valve closing direction caused by the leaf spring 58 and the back pressure of the pilot chamber 57, passes through the gap 80, the oil hole 54c of the passage member 54, and the oil hole 46d of the main valve member 46 from the gap 59, pushes the extension-side outlet check valve 47 open, and flows into the first oil chamber S3.

The oil flowed into the first oil camber S3 passes through the oil hole 19 shown in FIG. 1 from the first oil chamber S3 and flows into the piston-side oil chamber S1. At this point, an extension side damping force is generated in the shock absorber 1 by the flow resistance caused when the oil passes through the main valve 55. The flow of the oil at this point is indicated by broken line arrows in the hydraulic circuit shown in FIG. 5. Note that, for example, by stacking a plurality of disk valves in the extension-side outlet check valve 47, an extension side damping force may be auxiliarily generated in the extension-side outlet check valve 47 in addition to the extension side damping force generated in the main valve 55.

A part of the oil passed through the oil holes 43b of the valve seat member 43 from the second oil chamber S4 and flowed into the gap 59 passes through the pilot channel from the channel 56 and merges into the oil flowing through the main channel. Specifically, as indicated by broken line arrows in FIG. 7, a part of the oil passed through the oil holes 43b of the valve seat member 43 from the second oil chamber S4 and flowed into the gap 59 passes through the oil hole 55a of the main valve 55 from the channel 56 on the outer circumferential side of the main valve 55 and flows into the pilot chamber 57.

The oil flowed into the pilot chamber 57 passes through the oil holes 54e and 54d of the passage member 54, the oil hole 71 of the valve seat member 49, and the gap between the valve body 77 and the valve seat 71a and flows into the space 72 of the valve seat member 49. The oil flowed into the space 72 of the valve seat member 49 passes through the oil hole 77a formed in the valve body 77, pushes the fail-safe valve 75 open resisting the urging force of the spring 76, and flows into the space 74 of the core 63. The oil flowed into the space 74 passes through the oil hole 49c of the valve seat member 49, the channels 62 and 61, and the oil hole 54c of the passage member 54 and merges into the oil flowing through the main channel.

In this case, the fail-safe valve 75 functions as the check valve and prevents the backflow of the oil from the space 74 to the space 72 side. As explained above, the modulus of elasticity of the fail-safe valve 75 is set larger than the modulus of elasticity of the spring 76. Therefore, the fail-safe valve 75 slides to the other end side in the axial direction shown in FIG. 7 resisting the urging force of the spring 76 without bending and opens the oil hole 77a of the valve body 77.

The opening degree of the valve body 77 (the valve opening pressure of the valve body 77) can be changed by changing the electric current supplied to the coil 65 of the solenoid section 50 to adjust thrust generated in the solenoid section 50 and thereby controlling a pressing force to the valve seat 71a of the valve body 77. In this way, the flow resistance of the oil passing through the gap between the valve body 77 and the valve seat 71a is adjusted by changing the supply current to the coil 65 of the solenoid section 50 to adjust the opening degree of the valve body 77. Consequently, it is possible to adjust the internal pressure of the upstream-side pilot channel configuring the channel from the oil hole 55a to the oil hole 71. It is also possible to adjust the internal pressure (the back pressure) of the pilot chamber 57 by adjusting the internal pressure of the upstream-side pilot channel. As a result, it is possible to control the force for pressing the main valve 55 in the valve closing direction due to the internal pressure (the back pressure) of the pilot channel 57 and thus adjust the opening degree of the main valve 55. By adjusting the opening degree of the main valve 55 in this way, it is possible to adjust an extension side damping force generated by the flow resistance of the oil passing through the main valve 55. That is, at the normal time, the valve body 77 functions as the damping-force adjusting valve.

Specifically, when the supply current to the coil 65 is small, the pressing force to the valve seat 71a of the valve body 77 caused by the thrust of the solenoid section 50 is small, and thus the valve opening pressure of the valve body 77 is also small. Therefore, the opening degree of the valve body 77 increases, the flow resistance of the oil flowing in the valve body 77 decreases, and the internal pressure of the pilot chamber 57 (the pressure in the valve closing direction of the main valve 55) also decreases. As a result, the opening degree of the main valve 55 increases, the flow resistance of the oil flowing in the main valve 55 decreases, and the extension side damping force generated by the flow resistance also decreases.

Conversely, when the supply current to the coil 65 is large, the pressing force to the valve seat 71a of the valve body 77 caused by the thrust of the solenoid section 50 is large, and thus the valve opening pressure of the valve body 77 is also large. Therefore, the opening degree of the valve body 77 decreases, the oil flowing in the valve body 77 is throttled and the flow resistance of the oil increases, and the internal pressure of the pilot chamber 57 also increases. As a result, the opening degree of the main valve 55 decreases, the flow resistance of the oil flowing in the main valve 55 increases, and the extension side damping force generated by the flow resistance also increases.

In FIG. 9, a change in the extension side damping force with respect to piston speed Vp is shown using the supply current to the coil 65 as a parameter. The extension side damping forces at the time when the supply current to the coil 65 is $I_4$, $I_5$, and $I_6$ ($I_4 > I_5 > I_6$) is indicated by curves e, f, and g. The extension side damping force is larger as the supply current is larger.

In the extension side stroke, an amount of the oil equivalent to the volume of the piston rod 3 exiting the inner cylinder 2a of the cylinder 2 passes through the communication path 26b from the reservoir oil chamber S5 of the reservoir 30 and flows into the oil chamber S as indicated by chain line arrows in FIG. 7. The oil flowed into the oil chamber S passes through the oil holes 43d and the space 43a of the valve seat member 43, flows into the gap 80, and merges into the oil flowing through the main channel in the gap 80. The oil merged with the oil flowing through the main channel passes through the oil hole 54c of the passage member 54 and the oil hole 46d of the main valve member 46, pushes the extension-side outlet check valve 47 open, and flows into the first oil chamber S3. The oil flowed into the first oil chamber S3 is supplied to the piston-side oil chamber S1 through the oil hole 19 shown in FIG. 1. Therefore, the bladder 32 of the reservoir 30 expands, and the gas on the inside expands. According to the expansion of the gas, a capacity change in the inner cylinder 2a involved in an exit of the piston rod 3 from the inner cylinder 2a of the cylinder 2 is compensated.

(1-3) Failure Time

Action of the shock absorber 1 at the failure time when the solenoid section 50 does not normally operate because of some cause is explained with reference to FIG. 8 and FIGS. 10A and 10B.

At the failure time when the solenoid section 50 does not normally operate, the thrust (electromagnetic force) for moving the valve body 77 resisting the spring 73 is not generated. As explained above, the modulus of elasticity of the spring 73 that urges the valve body 77 in the valve opening direction is set larger than the modulus of elasticity of the spring 76 that urges the valve body 77 in the valve closing direction. Therefore, the valve body 77 slides in the valve opening direction (the other end side in FIG. 8) with the urging force of the spring 73 together with the fail-safe valve 75 in contact with the valve body 77. In a state in which the valve body 77 and the fail-safe valve 75 move in the valve opening direction most (a most compressed state of the spring 76), as shown in FIG. 8, an inner circumferential portion of the fail-safe valve 75 is held and fixed by the valve body 77 and the spring 76. In this case, the valve body 77 is substantially urged in the valve opening direction by the elastic force of the spring 73 and the hydraulic pressure of the oil. That is, urging means for urging the valve body 77 in the valve opening direction is the spring 73 and the hydraulic pressure. In this way, the valve body 77 is urged in the valve opening direction by not only the hydraulic pressure but also the spring 73. Therefore, it is possible to allow the valve body 77 to easily shift to a state in which the valve body 77 is moved to the valve opening direction most. Since the spring 73 is included in the urging means for urging the valve body 77 in the valve opening direction, it is possible to freely set the valve opening pressure of the valve body 77 by adjusting the modulus of elasticity of the spring 73. Further, since the urging means includes the hydraulic pressure, it is possible to continuously change the valve opening pressure. In this embodiment, since the urging means includes the spring 73 and the hydraulic pressure, it is possible to continuously change the valve opening pressure of the valve body 77 and extend a setting range of the valve opening pressure.

In the state explained above, the valve body 77 is in the full-open state. Therefore, when the fail-safe function by the fail-safe valve 75 is not exhibited, since the internal pressure of the pilot chamber 57 decreases, the opening degree of the main valve 55 increases and, since the flow resistance of the oil passing through the main valve 55 decreases, the compression side and extension side damping forces suddenly decrease, and the operation stability of the motorcycle is hindered as explained above.

In this embodiment, at the failure time, in the state shown in FIG. 8 in which the valve body 77 and the fail-safe valve 75 move most, the inner circumferential portion 75d of the fail-safe valve 75 is held and fixed by the supporting portion 77d of the valve body 77 and the spring 76 via the spring receiving sheet 78. When the internal pressure of the pilot chamber 57 exceeds a predetermined value, the outer circumferential portion 75e of the fail-safe valve 75 bends as indicated by a dotted line in FIG. 8 and is spaced from the non-supporting portion 77e of the valve body 77. Therefore, the oil in the pilot channel flows in the fail-safe valve 75, and a sudden decrease in the internal pressure of the pilot chamber 57 is prevented by the flow resistance caused when the oil passes through the fail-safe valve 75. As a result, a sudden decrease in the damping force due to a sudden increase in the opening degree of the main valve 55 is prevented. Consequently, the fail-safe function by the fail-safe valve 75 is performed, and deterioration in the operation stability of the motorcycle is thus prevented.

For example, the compression side damping force changing along any one of the curves a, b, and c shown in FIG. 9 during the compression side stroke changes along a curve d indicated by a dotted line at the failure time. A sudden decrease in the compression side damping force at the failure time is thus prevented. Also, the extension side damping force changing along any one of the curves e, f, and g shown in FIG. 9 during the extension side stroke changes along a curve h indicated by a dotted line at the failure time. A sudden decrease in the extension side damping force at the failure time is thus prevented. In this case, even at the failure time when the solenoid section 50 does not normally operate, it is possible to open a channel with the fail-safe valve 75. It is therefore possible to adjust the inner pressure of the channel with setting of the opening degree of the fail-safe valve 75. That is, instead of the valve body 77 functioning as the main damping-force adjusting valve at the normal time, the fail-safe valve 75 functions as a damping-force adjusting valve at the failure time. Even when a shock load from a road surface is hard and the damping force is considerably large as a result of expanding an adjustment range of damping force characteristics, at the failure time, the damping force can be set to a moderate damping force rather than hard characteristics, for example, a medium damping force between hard and soft.

A relation between the position of the valve body 77 and the valve opening pressure of the fail-safe valve 75 is shown in FIG. 10A. At the normal time when the solenoid section 50 normally operates, according to adjustment of the thrust of the solenoid section 50, for example, a moving amount (a lift amount) of the fail-safe valve 75 increases and a load in the valve closing direction (one end side in FIG. 8) by the spring 76 also increases according to the increase in the moving amount. As a result, the valve opening pressure of the fail-safe valve 75 is also increased. The modulus of elasticity of the fail-safe valve 75 is represented as kf, and the modulus of elasticity of the spring 76 is represented as k1. The fail-safe valve 75 is a thin general disk valve. At the normal time, the fail-safe valve 75 is not fixed any part and, in particular, movable in the axial direction. Therefore, the fail-safe valve 75 can be regarded effectively as the rigid body. When the fail-safe valve 75 can be regarded as the rigid body, k1<<kf, kf=∞ (infinite). That is, a combined modulus of elasticity kg of the spring 76 and the fail-safe valve 75, when both of which are regarded as elastic bodies, is kg=k1·kf/(k1+kf)=k1/(1+k1/kf)=k1.

Therefore, as shown in FIG. 10A, at the normal time, the valve opening pressure of the fail-safe valve 75 against the valve body 77 linearly increases together with the moving amount of the valve body 77 at the modulus of elasticity k1.

On the other hand, at the failure time when the solenoid section 50 does not normally operate, in the case of the first embodiment shown in FIG. 8, for example, the inner circumferential portion 75d of the fail-safe valve 75 is fixed and the outer circumferential portion 75e is spaced from the valve body 77. In the fail-safe valve 75 in this case, the inner circumferential portion 75d is fixed and the outer circumferential portion 75e is not fixed. Therefore, unlike the normal time, the modulus of elasticity kf of the fail-safe valve 75 is not infinite at which the fail-safe valve 75 can be regarded as the rigid body. Accordingly, at the failure time, the valve opening pressure of the fail-safe valve 75 against the valve body 77 linearly increases together with the moving amount of the valve body 77 at the modulus of elasticity kf of the fail-safe valve 75, which is a fixed value.

Therefore, a sudden decrease in the internal pressure of the pilot chamber 57 is prevented by the flow resistance caused when the oil in the pilot channel passes through the gap between the fail-safe valve 75 and the valve body 77. As a result, a sudden decrease in the damping force due to a sudden increase in the opening degree of the main valve 55 is prevented. The damping force is thus maintained at a certain value or more. Consequently, the fail-safe function by the fail-safe valve 75 is performed.

Note that, in the case of the first embodiment, since the fail-safe valve 75 is the thin general disk valve, the fail-safe valve 75 can be regarded effectively as the rigid body at the normal time. However, not only this, but, when the fail-safe valve 75 acts as an elastic body having a certain value rather than the infinite as the modulus of elasticity kf from the normal time, both of the spring 76 (corresponding to the first elastic body) and the fail-safe valve 75 (corresponding to the second elastic body) are regarded as elastic bodies. Accordingly, the combined modulus of elasticity kg is kg=k1·kf/(k1+kf). Therefore, naturally, the valve opening pressure of the fail-safe valve 75 against the valve body 77 may be set to linearly increase together with the moving amount of the valve body 77 at the combined modulus of elasticity kg=k1·kf/(k1+kf).

As explained above, in the shock absorber 1 according to this embodiment, at the normal time when the solenoid section 50 normally operates, the fail-safe valve 75 comes into contract with the valve body 77 and closes the pilot channel. When the internal pressure of the pilot chamber 57 exceeds the predetermined value, the fail-safe valve 75 opens. That is, the fail-safe valve 75 allows only a flow of the oil in the pilot channel 90 in the valve opening direction of the fail-safe valve 75 and prevents a flow in the valve closing direction. Therefore, a backflow of the oil is prevented and a check valve function is performed.

At the failure time when the solenoid section 50 does not operate, the fail-safe function by the fail-safe valve 75 is performed, and deterioration in operation stability of the motorcycle is prevented. Note that the fail-safe valve 75 itself is elastically deformed to adjust the damping force. Therefore, for example, the damping force characteristics can be set as linear characteristics.

In the shock absorber 1 according to this embodiment, the supporting portion 77d and the non-supporting portion 77e of the valve body 77 shown in FIG. 8 with respect to the fail-safe valve 75 are desirably integrally formed by the same component. Since the supporting portion 77d and the non-supporting portion 77e of the valve body 77 are integrally formed by the same component, it is easy to form the supporting portion 77d and the non-supporting portion 77e of the valve body 77 on the same plane. For example, in this embodiment, since the supporting portion 77d and the non-supporting portion 77e of the valve body 77 are formed on the same plane, the fail-safe valve 75 can be brought into contact with the same plane on the other end side of the valve body 77. Therefore, at the failure time as well, since the supporting portion 77d and the non-supporting portion 77e of the valve body 77 are formed on the same plane, it is possible to bring the fail-safe valve 75 into contact with the supporting portion 77d and the non-supporting portion 77e of the valve body 77 simultaneously. From a state in which the fail-safe valve 75 is brought into contact with the end portion on the other end side of the valve body 77, the fail-safe valve 75 starts to bend when the pressure of the oil in the upstream-side pilot channel increases. Therefore, when the supporting portion 77d and the non-supporting portion 77e of the valve body 77 are not on the same plane because of, for example, a manufacturing error, a shift occurs between timing when the fail-safe valve 75 and the supporting portion 77*d* of the valve body 77 come into contact with each other and timing when the fail-safe valve 75 and the non-supporting portion 77*e* of the valve body 77 come into contact with each other. Consequently, it is likely that variation occurs in the damping force at the failure time. It is easier to form the supporting portion 77*d* and the non-supporting portion 77*e* on the same plane when the supporting portion 77*d* and the non-supporting portion 77*e* are formed by the same component rather than being formed by separate components. Dimension management during manufacturing is also easier. Therefore, by forming the supporting portion 77*d* and the non-supporting portion 77*e* of the valve body 77 by the same component to form the supporting portion 77*d* and the non-supporting portion 77*e* of the valve body 77 on the same plane, it is possible to suppress variation of the damping force and thereby attain stability of the damping force at the failure time.

However, this disposition of the supporting portion 77*d* and the non-supporting portion 77*e* of the valve body 77 is not limited to the purpose of the prevention of variation of the damping force. Since the supporting portion 77*d* and the non-supporting portion 77*e* of the valve body 77 are formed by the same component, naturally, for example, it is also easy to make a selection not to form the supporting portion 77*d* and the non-supporting portion 77*e* on the same plane in order to intentionally apply a preset force to a bend of the fail-safe valve 75. In any case, when the supporting portion 77*d* and the non-supporting portion 77*e* of the valve body 77 with respect to the fail-safe valve 75 are formed by the same component, dimension management is facilitated.

In the shock absorber 1 according to this embodiment, the fail-safe valve 75 is disposed in a state in which the fail-safe valve 75 is set in contact with the end portion on the other end side (the end portion on the downstream side) of the valve body 77. At the failure time as well, the fail-safe valve 75 is set in contact with a rear surface side of the valve body 77 at both of the supporting portion 77*d* and the non-supporting portion 77*e* of the valve body 77. The fail-safe valve 75 bends from this state with the pressure of the oil and exhibits a valve function. Therefore, it is possible to suppress a situation in which, for example, the supporting portion 77*d* and the non-supporting portion 77*e* cause a positional shift because of, for example, the manufacturing error and variation occurs in the damping force at the failure time. Consequently, it is possible to attain stability of the damping force at the failure time.

Figure 11A:
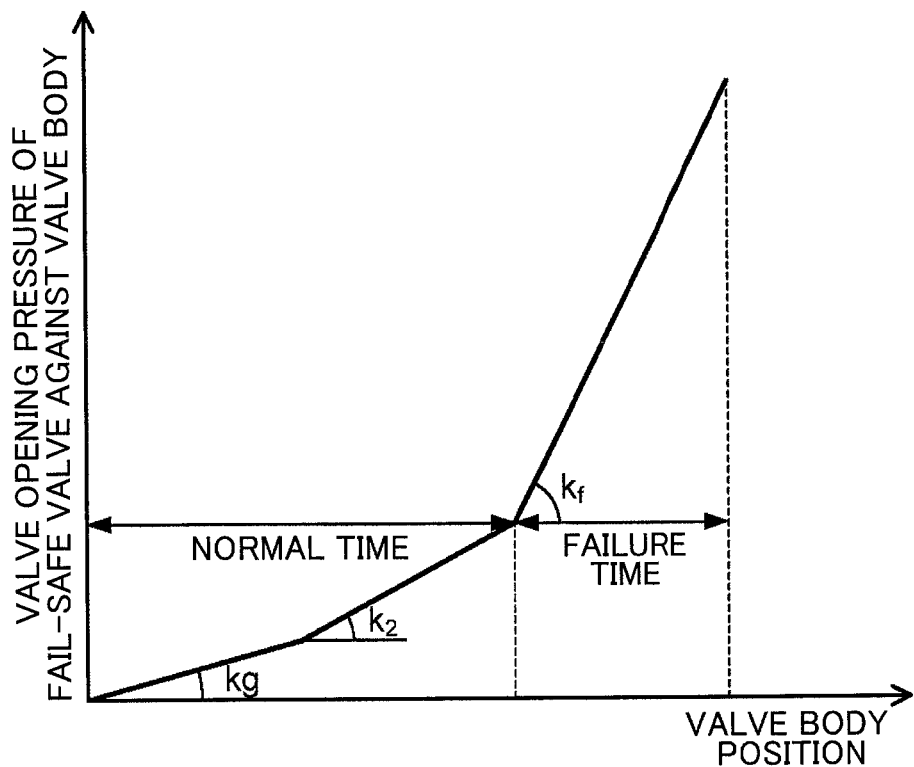
FIGS. 11A and 11B are diagrams showing another example of the modulus of elasticity of the spring that urges the fail-safe valve and the fail-safe valve.
Figure 11B:
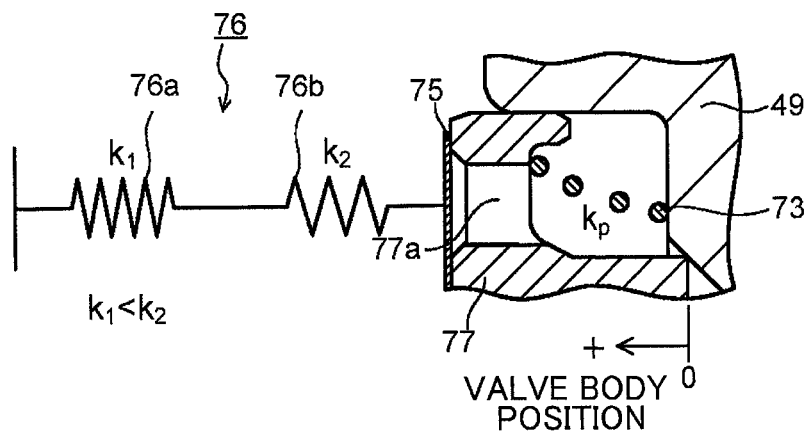

Another configuration example of the valve mechanism including the fail-safe valve 75 is explained with reference to FIGS. 11A to 19. Note that FIG. 11A shows a relation between a valve body position of the fail-safe valve and a valve opening pressure against the valve body, and that FIG. 11B shows a sectional schematic configuration of a main part of the valve mechanism. FIGS. 12 to 19 show other sectional schematic configurations of the main part of the valve mechanism.

In the aforementioned embodiment, the spring 76 having the modulus of elasticity k1 and the fail-safe valve 75 including the disk valve having the modulus of elasticity kf are combined to form the combined elastic body, and the modulus of elasticity of which substantially changes in two stages. However, for example, as shown in FIG. 11B, the spring 76 that presses the fail-safe valve 75 against the end portion on the downstream side of the valve body 77 may be configured by combining a plurality of springs having different moduli of elasticity such as a spring 76*a* having a modulus of elasticity k1 and a spring 76*b* having a modulus of elasticity k2 (k1<k2) to form a combined elastic body having a combined modulus of elasticity kg of the springs 76*a* and 76*b*.

In this case, as shown in FIG. 11A, at the normal time, the fail-safe valve 75 opens at the modulus of elasticity kg until the valve opening pressure reaches a predetermined valve opening pressure. When the valve opening pressure exceeds the predetermined valve opening pressure, the fail-safe valve 75 opens at the modulus of elasticity k2. At the failure time, the fail-safe valve 75 opens at the modulus of elasticity kf of the fail-safe valve 75 itself. With such a configuration, since the spring 76 includes the plurality of springs 76*a* and 76*b*, in the beginning, a load is applied in the valve closing direction of the fail-safe valve 75 at the modulus of elasticity kg of the combined elastic body of the spring 76*a* and the spring 76*b*. Therefore, the valve opening pressure of the fail-safe valve 75 changes at the modulus of elasticity kg according to action and reaction. Thereafter, when the spring 76*a* is compressed most, the modulus of elasticity of the spring 76 changes to the modulus of elasticity k2 of the spring 76*b* other than the spring 76*a* compressed most. Therefore, the valve opening pressure of the fail-safe valve 75 at the normal time can be changed in multiple stages (two stages or more), and it is possible to improve a degree of freedom of setting of damping force adjustment. Note that the combined modulus of elasticity kg obtained when the spring having the modulus of elasticity k1 and the spring having the modulus of elasticity k2 are combined is kg=k1·k2/(k1+k2). In FIG. 11B, Kp represents a modulus of elasticity of the spring 73 that urges the valve body 77 in the valve opening direction. In this case, k1<kp and k2<kp. In this way, the modulus of elasticity kp of the spring 73 is higher than the modulus of elasticity k1 of the spring 76*a* and the modulus of elasticity k2 of the spring 76*b*. Therefore, it is possible to allow the valve body 77 to easily shift to a state in which the valve body 77 is opened most at the failure time. In this case, as in the embodiment shown in FIG. 8, at the normal time, the fail-safe valve 75 can be regarded as a rigid body, and the fail-safe valve 75 acts at kf=∞. Therefore, the fail-safe valve 75 does not affect the combined modulus of elasticity kg. The valve opening pressure of the fail-safe valve 75 against the valve body 77 linearly increases together with the moving amount of the valve body 77 at the combined modulus of elasticity kg=k1·k2/(k1+k2) in the beginning and at the modulus of elasticity k2 of the spring 76*b* when the spring 76*a* is compressed most. On the other hand, at the failure time, the valve opening pressure of the fail-safe valve 75 against the valve body 77 linearly increases together with the moving amount of the valve body 77 at the modulus of elasticity kf of the fail-safe valve 75, which is not infinite but a certain value.

Note that, in the case shown in FIGS. 11A and 11B, since the fail-safe valve 75 is the thin general disk valve, the fail-safe valve 75 can be regarded effectively as a rigid body at the normal time. However, not only this, but, when the fail-safe valve 75 acts as an elastic body having a certain value rather than the infinite as the modulus of elasticity kf from the normal time, the spring 76*a* (equivalent to the first elastic body), the spring 76*b* (equivalent to the first elastic body), and the fail-safe valve 75 (equivalent to the second elastic body) are regarded as three elastic bodies. Therefore, the combined modulus of elasticity kg is kg=k1·k2·kf/(k1+k2+kf). Therefore, naturally, the valve opening pressure of the fail-safe valve 75 against the valve body 77 may be set to linearly increase together with the moving amount of the valve body 77 at the combined modulus of elasticity kg=k1·k2·kf/(k1+k2+kf). In this case, when the spring 76a is compressed most, the valve opening pressure of the fail-safe valve 75 against the valve body 77 linearly increases together with the moving amount of the valve body 77 at the combined modulus of elasticity kg=k2·kf/(k2+kf). At the failure time, the valve opening pressure of the fail-safe valve 75 against the valve body 77 linearly increases together with the moving amount of the valve body 77 at the modulus of elasticity kf of the fail-safe valve 75.

Figure 12:
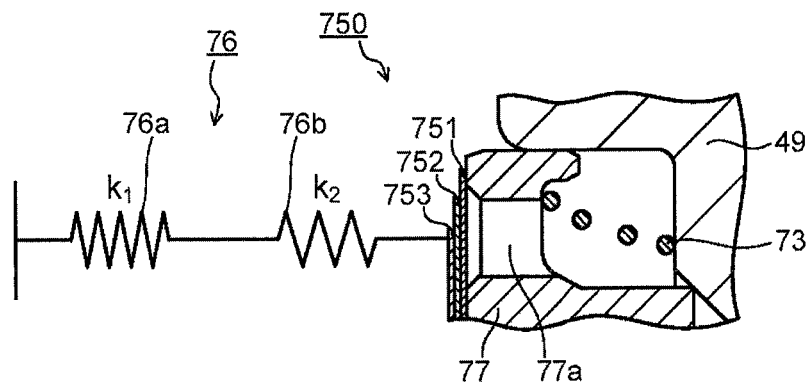
FIG. 12 is a diagram showing another configuration example of the fail-safe valve.

In the configuration of the fail-safe valve 75 explained above, the fail-safe valve 75 is configured by one disk valve. However, for example, as shown in FIG. 12, the modulus of elasticity of the fail-safe valve 75 can be adjusted according to, for example, the number of stacks of disk valves. That is, a setting range of the damping force by the modulus of elasticity of the fail-safe valve 75 is expanded according to the number of stacks of disk valves. Therefore, a degree of freedom of the damping force is increased. Note that, in FIG. 12, a plurality of disk valves having different sizes are stacked. However, not only this, but, naturally, a plurality of disk valves having the same size may be stacked to set the damping force. Further, the modulus of elasticity of the fail-safe valve 75 can be adjusted by changing thickness of the disk valve other than the number of stacks of disk valves.

In FIG. 12, disk valves 751, 752, and 753 have different sizes in the radial direction. However, although not shown in the figure, at least one of the shapes and the sizes of the disk valves 751, 752, and 753 may be different, for example, a cutout or an opening may be provided in a part of the disk valves 751, 752, and 753. With such a configuration, the plurality of disk valves are not simply stacked. The setting range of the damping force at the failure time is further expanded and fine adjustment can also be performed. Therefore, it is possible to increase a degree of freedom of setting of the damping force.

Figure 13:
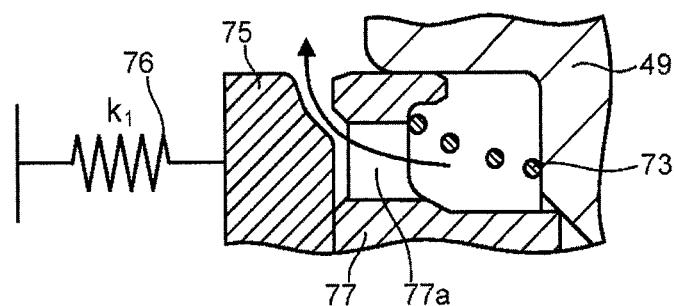
FIG. 13 is a diagram showing still another configuration example of the fail-safe valve.
Figure 14:
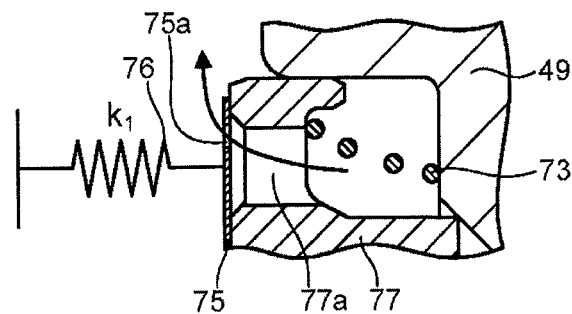
FIG. 14 is a diagram showing a configuration example in which an orifice is provided in the fail-safe valve.
Figure 15:
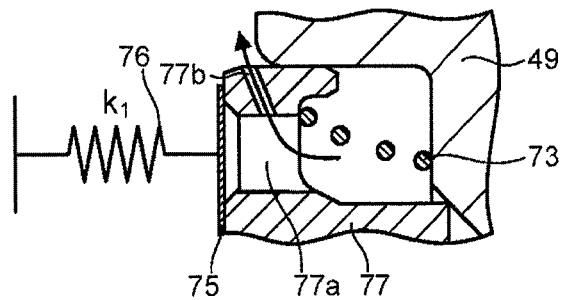
FIG. 15 is a diagram showing a configuration example in which the orifice is provided in a valve body.
Figure 16:
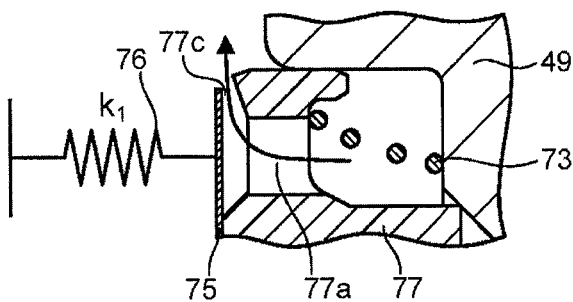
FIG. 16 is a diagram showing a configuration example in which the orifice is provided between the fail-safe valve and the valve body.

Further, configurations of the fail-safe valve 75 explained above, the fail-safe valve 75 is configured by one or more disk valves, and a non-supported portion bends to allow the oil to circulate. However, for example, as shown in FIG. 13, the fail-safe valve 75 may be configured by a deformable material such as rubber or other resin. When the valve opening pressure is applied to the fail-safe valve 75, a part of the fail-safe valve 75 may be deformed to allow the oil to circulate.

Figure 17:
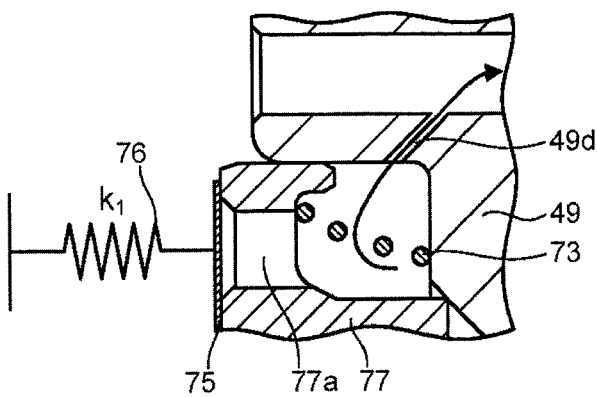
FIG. 17 is a diagram showing a configuration example in which the orifice is provided in a valve seat.

For example, as shown in FIGS. 14 to 17, an orifice (an opening) 75a may be provided in the fail-safe valve 75 (FIG. 14), an orifice (an opening) 77b may be provided in the valve body 77 (FIG. 15), a gap as an orifice (an opening) 77c may be provided at a place between the fail-safe valve 75 and the valve body 77 (FIG. 16), or an orifice (an opening) 49d may be provided in the valve seat member 49 (FIG. 17). In these cases, even when the fail-safe valve 75 is closed, the oil can circulate through the orifice 75a, 77b, 77c, or 49d. In this way, the orifice 75a, 77b, 77c, or 49d is formed in at least any one of the fail-safe valve 75, the valve body 77, the gap between the fail-safe valve 75 and the valve body 77, and the valve seat member 49, and thus, even when the fail-safe valve 75 does not open, the damping force at the failure time can be adjusted by the orifice. When at least one of the orifices mentioned above is formed, it is possible to reduce the damping force in a low-speed region of the piston.

Figure 18:
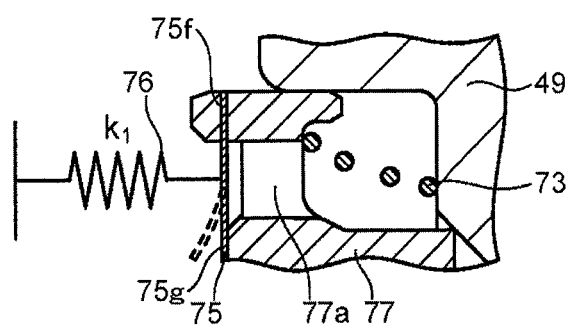
FIG. 18 is a diagram showing yet another configuration of the fail-safe valve.
Figure 19:
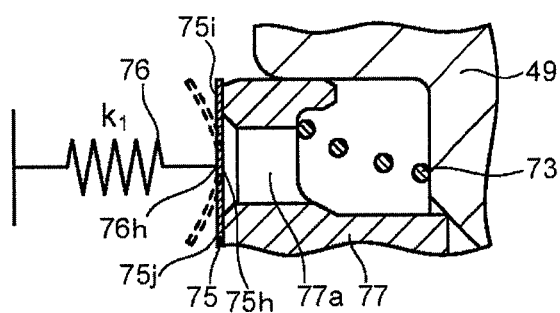
FIG. 19 is a diagram showing further configuration of the fail-safe valve.

In the embodiments explained above, as shown in FIG. 8, the inner circumferential portion of the valve body 77 is set as the supporting portion 77d, the inner circumferential portion 75d of the fail-safe valve 75 is supported and fixed at the failure time, and the outer circumferential portion 75e of the fail-safe valve 75 is spaced from the valve body 77. However, for example, as shown in FIG. 18, an outer circumferential portion 75f of the fail-safe valve 75 may be supported and fixed and an inner circumferential portion 75g of the fail-safe valve 75 may be spaced from the valve body 77. Further, for example, as shown in FIG. 19, a supporting portion 76h that support an intermediate portion 75h of the fail-safe valve 75 may be formed in the spring 76, which is the first elastic body, the intermediate portion 75h of the fail-safe valve 75 may be supported and fixed, and an outer circumferential portion 75i and an inner circumferential portion 75j of the fail-safe valve 75 may be spaced from the valve body 77. Note that, in FIG. 19, in the fail-safe valve 75, the intermediate portion 75h is supported by the supporting portion 76h of the spring 76 and the outer circumferential portion 75i and the inner circumferential portion 75j are spaced from the valve body 77 and bent. However, not only this, but, naturally, the entire fail-safe valve 75 including the intermediate portion 75h as well as the outer circumferential portion 75i and the inner circumferential portion 75j may be completely spaced from the valve body 77 to the left in FIG. 19.

Note that, in the first embodiment, in order to adjust the internal pressure of the pilot chamber 57, the valve body 77 and the fail-safe valve 75 function as the damping-force adjusting valve. The valve seat member 49, the spring 73, the spring 76, and the solenoid section 50 as well as the valve body 77 and the fail-safe valve 75 function as the damping-force adjusting section 70. However, not only this, but the valve body 77 and the fail-safe valve 75 may be used as a main valve mechanism that generates the damping force. The valve seat member 49, the spring 73, the spring 76, and the solenoid section 50 as well as the valve body 77 and the fail-safe valve 75 may also be used as the main valve mechanism that generates the damping force.

Other Hydraulic Circuits

Figure 20:
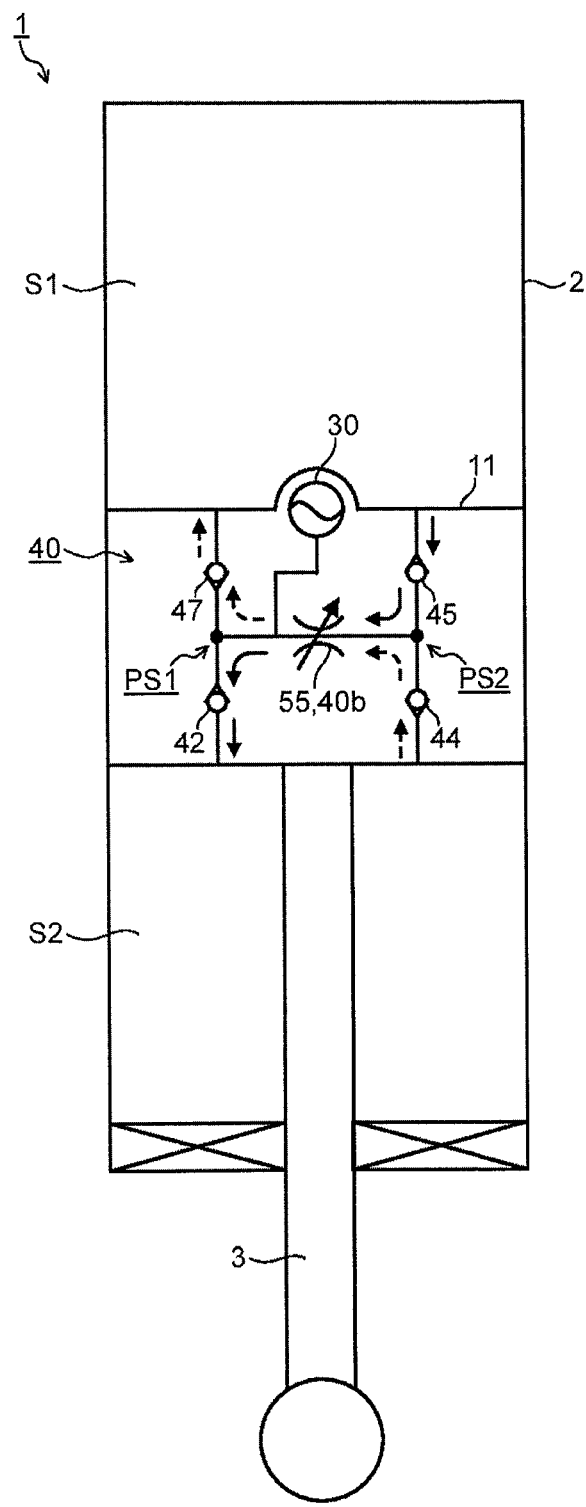
FIG. 20 is a hydraulic circuit diagram of a shock absorber in a second embodiment.
Figure 21:
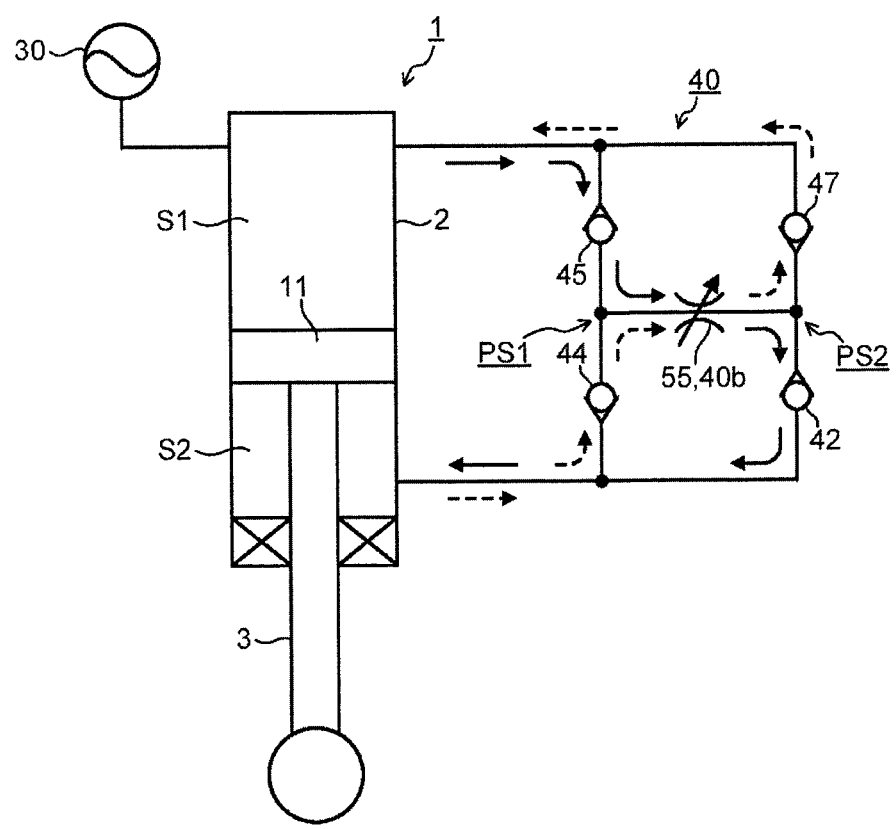
FIG. 21 is a hydraulic circuit diagram of a shock absorber in a third embodiment.
Figure 22:
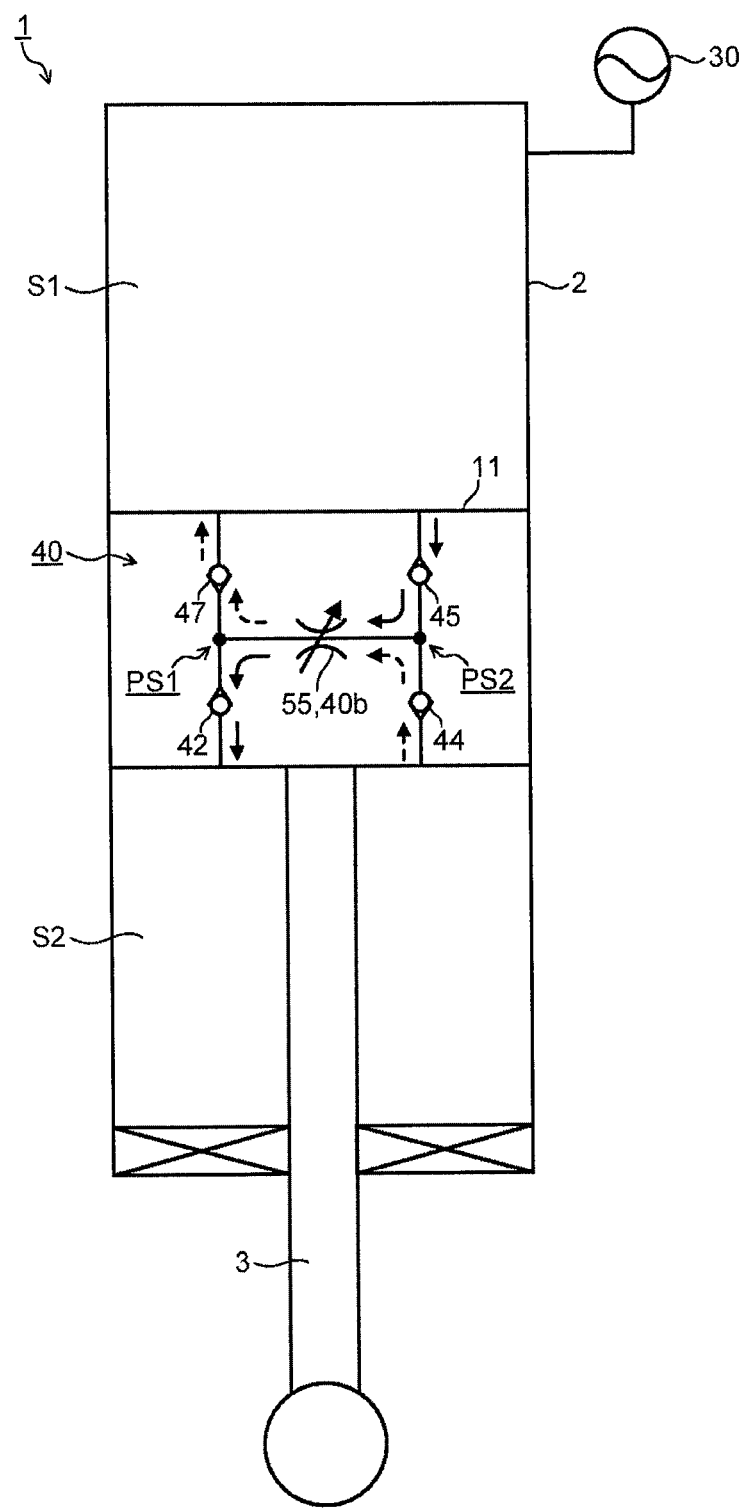
FIG. 22 is a hydraulic circuit diagram of a shock absorber in a fourth embodiment.
Figures 23A, 23B:
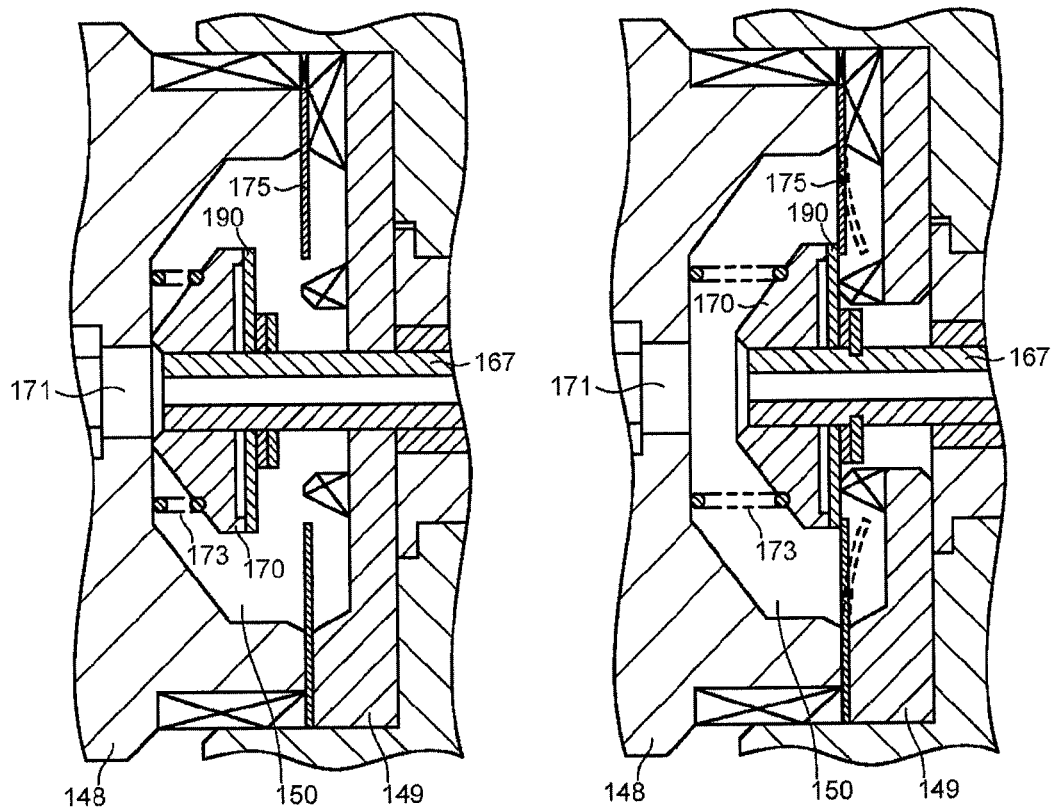
FIGS. 23A and 23B are longitudinal sectional views of a main part of a related art hydraulic shock absorber.

Note that, in the shock absorber 1 in the present invention, the hydraulic circuit is not limited to the hydraulic circuit shown in FIG. 5. FIGS. 20 to 22 are hydraulic circuit diagrams in second to fourth embodiments of other configurations in the shock absorber 1 in the present invention. Note that components same as the components of the hydraulic circuit shown in FIG. 5 are denoted by the same reference numerals and signs and redundant explanation of the components is omitted or simplified. In FIGS. 20 to 22, a flow of the oil during the compression side stroke is indicated by solid lines and a flow of the oil during the extension side stroke is indicated by broken lines.

Hydraulic Circuit Shown in FIG. 20

The hydraulic circuit shown in FIG. 20 includes the main valve 55, the back-pressure adjusting section 40b, the compression-side inlet check valve 45, the compression-side outlet check valve 42, the extension-side inlet check valve 44, the extension-side outlet check valve 47, and the reservoir 30.

As shown in FIG. 20, the functions of the hydraulic circuit may also be provided in the piston 11. That is, the damping-force generating device 40 and the reservoir 30 may be provided on the inside of the cylinder 2. However, not only this, but the reservoir 30 may be provided in the cylinder 2 and on the outside of the piston 11. The reservoir 30 may also be provided on an inside of an axle-side attachment member 7 or a vicinity of the axle-side attachment member 7 via a channel piercing through the inside of the piston rod 3.

The reservoir 30 communicates with an oil path divided on the downstream side of the main valve 55 and the back-pressure adjusting section 40b. In this way, the oil path communicating with the reservoir 30 is divided on the downstream side of the main valve 55 and the back-pressure adjusting section 40b. Consequently, the oil after being damped by the main valve 55 is led into the reservoir 30. That is, the pressure of the rod-side oil chamber S2 substantially depends on only the pressure of a not-shown air chamber present in the reservoir 30 (the space on the inside of the bladder 32 shown in FIG. 2) and does not vary with setting of the channel resistance of the main valve 55. Therefore, it is possible to avoid a pause of the damping force during reversal from the compression side stroke to the extension side stroke.

(2-1) Compression Side Stroke

In the shock absorber 1 including such a hydraulic circuit, in the compression side stroke, a flow of the oil is indicated by solid line arrows in the hydraulic circuit shown in FIG. 20. Specifically, the oil in the piston-side oil chamber S1, the pressure of which increases because the piston rod 3 moves upward relatively to the cylinder 2, passes through the oil hole 46c of the main valve member 46, pushes the compression-side inlet check valve 45 open resisting the urging force of the leaf spring 60, and flows to the gap 59 (see FIG. 6).

The oil flowed into the gap 59 pushes the main valve 55 open resisting the force in the valve closing direction caused by the leaf spring 58 and the back pressure of the pilot chamber 57 and flows from the gap 59 to the gap 80 and the space 43a of the valve seat member 43. The oil flowed into the space 43a passes through the oil holes 43c, pushes the compression-side outlet check valve 42 open, and flows into the rod-side oil chamber S2. At this point, a main compression side damping force is generated in the shock absorber 1 by flow resistance caused when the oil passes through the main valve 55. Note that, for example, by stacking a plurality of disk valves in the compression-side outlet check valve 42, a compression side damping force may be auxiliarily generated in the compression-side outlet check valve 42 in addition to the main compression side damping force generated in the main valve 55.

A part of the oil passed through the oil hole 46c of the main valve member 46 and flowed into the gap 59 passes through the pilot channel and merges into the oil flowing through the main channel. Specifically, as indicated by broken line arrows in FIG. 6, a part of the oil passed through the oil hole 46c of the main valve member 46 from the first oil chamber S3 and flowed into the gap 59 passes through the oil hole 55a of the main valve 55 from the channel 56 on the outer circumferential side of the main valve 55 and flows into the pilot chamber 57.

The oil flowed into the pilot chamber 57 passes through the oil holes 54e and 54d of the passage member 54, the oil hole 71 of the valve seat member 49, and the gap between the valve body 77 and the valve seat 71a and flows into the space 72 of the valve seat member 49. The oil flowed into the space 72 of the valve seat member 49 passes through the oil hole 77a formed in the valve body 77, pushes the fail-safe valve 75 open resisting the urging force of the spring 76, and flows into the space 74 of the core 63. The oil flowed into the space 74 passes through the oil hole 49c of the valve seat member 49, the channels 62 and 61, and the oil hole 54c of the passage member 54 and merges into the oil flowing through the main channel.

Incidentally, in the compression side stroke, an amount of the oil equivalent to the volume of the piston rod 3 entering the inner cylinder 2a of the cylinder 2 is supplied to the reservoir 30 through the oil holes 43d of the valve seat member 43. Consequently, a capacity change in the inner cylinder 2a involved in an entry of the piston rod 3 into the inner cylinder 2a of the cylinder 2 is compensated.

(2-2) Extension Side Stroke

In the extension side stroke, a flow of the oil is indicated by broken line arrows in the hydraulic circuit shown in FIG. 20. Specifically, the oil in the rod-side oil chamber S2, the pressure of which increases because the piston rod 3 moves downward relatively to the cylinder 2, passes through the oil holes 43b of the valve seat member 43, pushes the extension-side inlet check valve 44 open resisting the urging force of the leaf spring 60, and flows to the gap 59 (see FIG. 7).

The oil flowed into the gap 59 pushes the main valve 55 open resisting the force in the valve closing direction caused by the leaf spring 58 and the back pressure of the pilot chamber 57, passes through the gap 80, the oil hole 54c of the passage member 54, and the oil hole 46d of the main valve member 46 from the gap 59, pushes the extension-side outlet check valve 47 open, and flows into the piston-side oil chamber S1. At this point, a main extension side damping force is generated in the shock absorber 1 by flow resistance caused when the oil passes through the main valve 55. Note that, for example, by stacking a plurality of disk valves in the extension-side outlet check valve 47, an extension side damping force may be auxiliarily generated in the extension-side outlet check valve 47 in addition to the main extension side damping force generated in the main valve 55.

A part of the oil passed through the oil holes 43b of the valve seat member 43 and flowed into the gap 59 passes through the pilot channel and merges into the oil flowing through the main channel. Specifically, as indicated by the broken line arrows in FIG. 7, a part of the oil passed through the oil holes 43b of the valve seat member 43 and flowed into the gap 59 passes through the oil hole 55a of the main valve 55 from the channel 56 on the outer circumference side of the main valve 55 and flows into the pilot chamber 57.

The oil flowed into the pilot chamber 57 passes through the oil holes 54e and 54d of the passage member 54, the oil hole 71 of the valve seat member 49, and the gap between the valve body 77 and the valve seat 71a and flows into the space 72 of the valve seat member 49. The oil flowed into the space 72 of the valve seat member 49 passes through the oil hole 77a formed in the valve body 77, pushes the fail-safe valve 75 open resisting the urging force of the spring 76, and flows into the space 74 of the core 63. The oil flowed into the space 74 passes through the oil hole 49c of the valve seat member 49, the channels 62 and 61, and the oil hole 54c of the passage member 54 and merges into the oil flowing through the main channel.

Incidentally, in the extension side stroke, an amount of the oil equivalent to the volume of the piston rod 3 exiting the inner cylinder 2a of the cylinder 2 passes through the oil holes 43d of the valve seat member 43 from the reservoir 30 and flows into the space 43a. The oil flowed into the space 43a flows into the gap 80 and merges into the oil flowing through the main channel. In this way, the amount of oil equivalent to the volume of the piston rod 3 exiting the inner cylinder 2a of the cylinder 2 is supplied to the piston-side oil chamber S1 from the reservoir 30. Consequently, a capacity change in the inner cylinder 2a involved in an exit of the piston rod 3 from the inner cylinder 2a of the cylinder 2 is compensated.

Hydraulic Circuit Shown in FIG. 21

As in the third embodiment shown in FIG. 21, the reservoir 30 may be provided to communicate with the piston-side oil chamber S1 without being juxtaposed with the damping-force generating device 40. Note that, in this case, the damping-force generating device 40 and the reservoir 30 are provided on the outside of the piston 11 and furthermore the outside of the cylinder 2.

The hydraulic circuit includes, as shown in FIG. 21, the main valve 55, the back-pressure adjusting section 40*b*, the compression-side inlet check valve 45, the compression-side outlet check valve 42, the extension-side inlet check valve 44, and the extension-side outlet check valve 47. The reservoir 30 is provided to directly communicate with the piston-side oil chamber S1. Note that, in order to lead a predetermined amount of the oil equivalent to the volume of the piston rod 3 entering the inner cylinder 2*a* of the cylinder 2 into the reservoir 30, for example, a not-shown orifice or a not-shown check valve is provided in an inlet of the reservoir 30 to adjust an amount of the oil to be led into the reservoir 30.

When the hydraulic circuit explained above is provided, since the reservoir 30 is not juxtaposed with the damping-force generating device 40, for example, the oil holes 43*d* of the valve seat member 43 and the oil chamber S shown in FIG. 3 are unnecessary. The reservoir 30 shown in FIG. 21 includes a channel separately communicating with the piston-side oil chamber S1.

(3-1) Compression Side Stroke

In the shock absorber 1 including such a hydraulic circuit, in the compression side stroke, a flow of the oil is indicated by solid line arrows in the hydraulic circuit shown in FIG. 21. Specifically, the oil in the piston-side oil chamber S1, the pressure of which increases because the piston rod 3 moves upward relatively to the cylinder 2, is supplied to the first oil chamber S3 of the damping-force generating device 40 shown in FIGS. 2 and 3 from the oil hole 19 shown in FIG. 1.

A part of the oil in the piston-side oil chamber S1 is led into the reservoir 30. An amount of the oil led into the reservoir 30 is equivalent to the volume of the piston rod 3 entering the inner cylinder 2*a* of the cylinder 2. Consequently, a capacity change in the inner cylinder 2*a* involved in an entry of the piston rod 3 into the inner cylinder 2*a* of the cylinder 2 is compensated.

A flow of the oil from the first oil chamber S3 is the same as the flow explained in (1-1) compression side stroke above except a flow of the oil led into the reservoir 30.

(3-2) Extension Side Stroke

In the extension side stroke, a flow of the oil is indicated by broken line arrows in the hydraulic circuit shown in FIG. 21. Specifically, the oil in the rod-side oil chamber S2, the pressure of which increases because the piston rod 3 moves downward relatively to the cylinder 2, is supplied to the second oil chamber S4 of the damping-force generating device 40 shown in FIGS. 2 and 3 through the oil holes 21 formed in the inner cylinder 2*a*, the channel 20 between the inner cylinder 2*a* and the outer cylinder 2*b*, and the oil holes 22 formed in the outer cylinder 2*b* and the channel 23 shown in FIG. 1.

The oil in the reservoir 30 is supplied to the piston-side oil chamber S1. Consequently, a capacity change in the inner cylinder 2*a* involved in an exit of the piston rod 3 from the inner cylinder 2*a* of the cylinder 2 is compensated.

A flow of the oil from the second oil chamber S4 is the same as the flow explained in (1-2) extension side stroke above except a flow of the oil led out from the reservoir 30.

Hydraulic Circuit Shown in FIG. 22

As in the fourth embodiment shown in FIG. 22, the functions of the hydraulic circuit may also be provided in the piston 11 and provided to communicate with the piston-side oil chamber S1. That is, the damping-force generating device 40 not juxtaposed with the reservoir 30 may be provided on an inside of the piston 11 of the cylinder 2. Note that the reservoir 30 is provided on the outside of the piston 11 and furthermore the outside of the cylinder 2.

The hydraulic circuit is the same as the hydraulic circuit shown in FIG. 20 except that the hydraulic circuit does not include the reservoir 30. The configuration of the reservoir 30 is the same as the configuration of the reservoir 30 shown in FIG. 21.

(4-1) Compression Side Stroke

In the shock absorber 1 including such a hydraulic circuit, in the compression side stroke, a flow of the oil is indicated by solid line arrows in the hydraulic circuit shown in FIG. 22. A specific flow of the oil is the same as the flow explained in (2-1) compression side stroke above except a flow of the oil led into the reservoir 30.

A part of the oil in the piston-side oil chamber S1 is led into the reservoir 30. An amount of the oil led into the reservoir 30 is equivalent to a volume of the piston rod 3 entering the inner cylinder 2*a* of the cylinder 2. Consequently, a capacity change in the inner cylinder 2*a* involved in an entry of the piston rod 3 into the inner cylinder 2*a* of the cylinder 2 is compensated.

(4-2) Extension Side Stroke

In the extension side stroke, a flow of the oil is indicated by broken line arrows in the hydraulic circuit shown in FIG. 22. Note that a specific flow of the oil is the same as the flow explained in (2-2) extension side stroke above except a flow of the oil led out from the reservoir 30.

The oil in the reservoir 30 is supplied to the piston-side oil chamber S1. Consequently, a capacity change in the inner cylinder 2*a* involved in an exit of the piston rod 3 from the inner cylinder 2*a* of the cylinder 2 is compensated.

As explained above, in the shock absorber 1 in the embodiments, the damping-force generating device 40 has a configuration in which, as shown in FIGS. 3 and 4, the first pressure chamber PS1 and the second pressure chamber PS2 overlapped in the radial direction in the substantially double ring shape. The configuration of the substantially double ring shape can be configured irrespective of whether the damping-force generating device 40 is provided on the outside of the piston 11 and the cylinder 2 as shown in FIGS. 5 and 21 or the damping-force generating device 40 is provided on the inside of the piston 11 and the cylinder 2 as shown in FIGS. 20 and 22. With the configuration of the substantially double ring shape, it is possible to attain compactness of a space.

In the damping-force generating device 40, the compression-side inlet check valve 45 and the extension-side inlet check valve 44 that allow only inflow of the oil are provided in the first pressure chamber PS1, and the compression-side outlet check valve 42 and the extension-side outlet check valve 47 that allow only outflow of the oil are provided in the second pressure chamber PS2. Therefore, in the compression side stroke, the oil flows in the order of the compression-side inlet check valve 45, the first pressure chamber PS1, the main valve 55, the second pressure chamber PS2, and the compression-side outlet check valve 42. In the extension side stroke, the oil flows in the order of the extension-side inlet check valve 44, the first pressure chamber PS1, the main valve 55, the second pressure chamber PS2, and the extension-side outlet check valve 47. Therefore, irrespective of which of the first pressure chamber PS1 and the second pressure chamber PS2 is on the inside or the outside, a flow of the oil that passes through the gap between the main valve 55 and the valve seat member 43 from the first pressure chamber PS1 and flows into the second pressure chamber PS2 is in the same direction in both of the compression side stroke and the extension side stroke. That is, in both of the compression side stroke and the extension side stroke, the oil flows in the same direction (one way) from a radially outer side to a radially inner side between one end of the main valve 55 and the valve seat member 43. Therefore, compared with when the oil flows in different directions in the compression side stroke and the extension side stroke, it is possible to simplify structure of the damping-force generating device 40 that generates an appropriate damping force. Consequently, it is possible to reduce the number of components of the damping-force generating device 40 and attain a reduction in costs.

The damping-force generating device 40 includes, in addition to one main valve 55, one pilot chamber 57 that causes an internal pressure in the valve closing direction to act on the main valve 55 and the damping-force adjusting section 70 that adjusts the internal pressure of the pilot chamber 57. In the damping-force adjusting section 70, in particular, the valve body 77 is spaced from the valve seat 71a or is seated on the valve seat 71a, whereby the internal pressure of the pilot chamber 57 is adjusted. The channel resistance of a main flow of the oil passing through the gap between the main valve 55 and the valve seat member 43 is adjusted based on a differential pressure between the valve opening pressure of the main valve 55 and the internal pressure in the valve closing direction of the pilot chamber 57. The internal pressure of the pilot chamber 57 can be adjusted by a small load for driving the valve body 77. Therefore, it is possible to adjust the damping force in a wide range. However, the present invention is not limited to such a configuration. The valve mechanism configuring the damping-force adjusting section 70 may be used as the main valve 55 to directly adjust the damping force.

In the damping-force generating device 40, a flow of the oil from the first pressure chamber PS1 to the pilot chamber 57 and from the pilot chamber 57 to the second pressure chamber PS2 in the pilot channel can be set in the same direction in both of the compression side stroke and the extension side stroke like the main flow of the oil that passes through the gap between the main valve 55 and the valve seat member 43. That is, in both of the compression side stroke and the extension side stroke, the oil flows in the same direction (one way) from the radially outer side to the radially inner side between one end (the left end in FIG. 3) of the main valve 55 and the valve seat member 43.

In particular, in the damping-force generating device 40, high levels of accuracy, complexity, and the like are requested for the components thereof configuring the main valve 55 and the pilot chamber 57 that causes the internal pressure in the valve closing direction to act on the main valve 55. Therefore, by configuring one main valve 55 and one pilot chamber 57 as one set and setting each of the main flow of the oil and the flow of the oil in the pilot channel in the same direction (one way) in both of the compression side stroke and the extension side stroke as in the embodiments, it possible to further simplify structure of the damping-force generating device 40 that generates the appropriate damping force. Consequently, it is possible to further reduce the number of components of the damping-force generating device 40 and attain the reduction in costs.

Incidentally, in principle, the valve body 77 configuring the damping-force adjusting section 70 is designed to be smaller than the main valve 55 in order to close the main valve 55 from the opposite side of the main flow of the oil. Since it is reasonable to arrange the components generally coaxially with a rod shaft, for example, a diameter of the valve body 77 needs to be designed to be smaller than a diameter of one end of the main valve 55 seated on the end face of the valve seat member 43. Therefore, it is natural that a channel near the pilot chamber 57 is relatively arranged further on an inner circumferential side than an outer circumferential side of the main valve 55. For example, it is natural that the downstream-side pilot channel is present further on the radial direction inner side than one end of the main valve 55 seated on the end face of the valve seat member 43. In this case, further compactness of the damping-force generating device 40 can be attained. In particular, further compactness of the damping-force generating device 40 can be attained when an outer circumference of one end of the channel 61, which is a part of the downstream-side pilot channel and is on a side merging with the main channel, is present further on the radial direction inner side than the outer circumference of one end of the main valve 55 seated on the end face of the valve seat member 43.

In terms of a configuration, the upstream side of the main valve 55, the pilot chamber 57, the damping-force adjusting section 70, and the downstream side of the main valve 55 need to be connected in this order. Therefore, a smooth configuration can be obtained by that the inner circumferential side of the main valve 55 is present downstream and does not cross the channel on the pilot chamber 57 side. Therefore, it is possible to configure the damping-force generating device 40 more compact.

In the present invention, the main valve 55 is formed in the substantially cylindrical shape. Therefore, it is possible to machine the main valve 55 inexpensively and easily. This is because a substantially cylindrical component can be easily lathe-machined and, with the lathe machining, components that require high accuracy such as a valve can be manufactured more inexpensively and easily than the other machining methods such as milling.

Further, as shown in the embodiments in FIGS. 5 and 21, the damping-force generating device 40 can be arranged in any position on the outside of the cylinder 2. It is possible to increase a degree of freedom of a layout concerning, for example, arrangement of the components configuring the damping-force adjusting section 70 that controls the internal pressure of the pilot chamber 57. Therefore, it is also possible to increase a degree of freedom of a layout concerning, for example, arrangement of the solenoid section 50, which is the actuator, and handling of a harness and the like.

In the embodiments shown in FIGS. 4, 5, and 20, by connecting the reservoir 30 to the second pressure chamber PS2 on the downstream side, excessive inflow of the oil into the reservoir 30 can be avoided, and therefore, it is possible to increase a degree of freedom of a damping force adjustment range, in particular, on the compression side without limitation of pressure.

Note that, in the first and third embodiments explained above, as an example, the present invention is applied to the shock absorber 1 used as the rear cushion of the motorcycle configured by providing the damping-force generating device 40 on the outside of the cylinder 2. However, the present invention can also be applied to a shock absorber used as a rear cushion configured by compactly incorporating the damping-force generating device 40 in the piston 11, as shown in FIGS. 20 and 22. By providing the damping-force generating device 40 on the inside of the piston 11 in this way, the damping-force generating device 40 can be configured compact without projecting to an outside of the shock absorber 1.

The present invention can also be applied to a shock absorber used as a front fork of a motorcycle configured by providing a damping-force generating device on an outside of a cylinder or a shock absorber used as a front fork configured by compactly incorporating a damping-force generating device in a piston. In this case, effects same as the effects explained above can be obtained.

In the embodiments, examples in which the present invention is applied to an inverted shock absorber configured by attaching the cylinder to the vehicle body side and attaching the piston rod to the axle side are shown. Further, the present invention can also be applied to an upright shock absorber configured by attaching a piston rod to a vehicle body side and attaching a cylinder to an axle side.

In the embodiments, examples in which the present invention is applied to the shock absorber used as the rear cushion that suspends the rear wheel of the motorcycle on the vehicle body are shown. Further, it goes without saying that the present invention can also be applied to a shock absorber that suspends wheels of any vehicle other than the motorcycle.

Several embodiments of the present invention are explained above. However, the embodiments are presented as examples and are not intended to limit scope of the invention. These new embodiments can be implemented in other various forms. Various omissions, substitutions, and changes can be made without departing from the spirit of the invention. These embodiments and modifications thereof are included in the scope and a gist of the invention and included in the scope of the invention described in claims and equivalents of the invention.

What is claimed is:

1. A shock absorber comprising:
   a cylinder in which fluid is sealed;
   a piston that is slidably fitted into the cylinder;
   a piston rod that is coupled to the piston and extends to an outside of the cylinder; and
   a valve mechanism that controls a flow of the fluid caused by sliding of the piston in the cylinder,
   wherein the valve mechanism includes:
      a valve body that is urged by urging means in a valve opening direction of a channel in which the fluid flows;
      a valve seat on which the valve body is seated to close the channel;
      an actuator that moves the valve body in a valve closing direction with thrust of a solenoid; and
      a fail-safe valve that is urged by a first elastic body in the valve closing direction of the valve body, at least a part of the fail-safe valve being seated on the valve body to close the channel and being spaced from the valve body to open the channel,
   when the fluid does not flow in the valve opening direction of the valve body, the fail-safe valve is urged by the first elastic body to thereby come into contact with the valve body and close the channel,
   when the fluid flows in the valve opening direction of the valve body, the fail-safe valve is spaced from the valve body by a fluid pressure to open the channel, and
   when the valve body moves most in the valve opening direction from the valve seat, the fail-safe valve is brought into contact with the valve body, the channel is closed, and a supporting portion of the valve body supports a part of the fail-safe valve, and, when the fluid flows in the valve opening direction of the valve body, at least a part of the fail-safe valve, which is in contact with a non-supporting portion other than the supporting portion of the valve body, is spaced from the valve body by the fluid pressure to open the channel.

2. The shock absorber according to claim 1, wherein the first elastic body is a combined elastic body, a modulus of elasticity of which changes in two or more stages.

3. The shock absorber according to claim 1, wherein the fail-safe valve is a second elastic body, and
   the fail-safe valve and the first elastic body forms a combined elastic body, a modulus of elasticity of which changes in two or more stages.

4. The shock absorber according to claim 1, wherein the fail-safe valve is formed by at least one disk valve.

5. The shock absorber according to claim 4, wherein the at least one disk valve includes a plurality of disk valves being stacked, and
   a combined modulus of elasticity of the fail-safe valve is adjusted according to at least one of the number of stacks and thickness of the disk valves.

6. The shock absorber according to claim 5, wherein the plurality of disk valves have at least different shapes or different sizes from one another.

7. The shock absorber according to claim 1, wherein an orifice is formed in at least one of the fail-safe valve, the valve body, a place between the fail-safe valve and the valve body, and the valve seat.

8. The shock absorber according to claim 1, wherein the urging means is a third elastic body and a fluid pressure.

9. The shock absorber according to claim 1, wherein the supporting portion and the non-supporting portion are integrally formed by a same component.

10. The shock absorber according to claim 1, wherein the supporting portion and the non-supporting portion are formed on a same plane.

11. The shock absorber according to claim 1, further comprising:
    a main valve that opens and closes for controlling a flow of the fluid caused by the sliding of the piston in the cylinder to generate a damping force;
    a pilot chamber an internal pressure of which acts on the main valve in the valve closing direction;
    a lead-in passage for leading the fluid into the pilot chamber; and
    a pilot channel that connects the pilot chamber and a downstream side of the main valve,
    wherein the valve mechanism is provided on the pilot channel and controls the internal pressure of the pilot chamber and the pilot channel.

* * * * *